United States Patent
Master et al.

(10) Patent No.: US 10,986,421 B2
(45) Date of Patent: Apr. 20, 2021

(54) IDENTIFICATION AND TIMING DATA FOR MEDIA CONTENT

(71) Applicant: DOLBY LABORATORIES LICENSING CORPORATION, San Francisco, CA (US)

(72) Inventors: Aaron S. Master, San Francisco, CA (US); Marvin Pribadi, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 176 days.

(21) Appl. No.: 16/024,386

(22) Filed: Jun. 29, 2018

(65) Prior Publication Data
US 2019/0007754 A1 Jan. 3, 2019

Related U.S. Application Data

(60) Provisional application No. 62/528,404, filed on Jul. 3, 2017.

(51) Int. Cl.
| | |
|---|---|
| G06F 15/16 | (2006.01) |
| H04N 21/84 | (2011.01) |
| H04L 29/08 | (2006.01) |
| H04N 21/8547 | (2011.01) |

(52) U.S. Cl.
CPC ......... *H04N 21/84* (2013.01); *H04L 67/1076* (2013.01); *H04N 21/8547* (2013.01)

(58) Field of Classification Search
CPC .............. H04N 21/84; H04N 21/8547; H04N 21/8352; H04L 67/1076
See application file for complete search history.

(56) References Cited

U.S. PATENT DOCUMENTS

| | | |
|---|---|---|
| 8,385,971 B2 | 2/2013 | Rhoads |
| 9,351,037 B2 | 5/2016 | Sinha |
| 9,401,153 B2 | 7/2016 | Sharma |

(Continued)

FOREIGN PATENT DOCUMENTS

WO 2015/105400 7/2015

OTHER PUBLICATIONS

Lin, Xiaofan "Automatic Content Recognition for the Next-Generation TV Experience" Proc. of SPIE, Imaging and Printing, Jan. 2012.

(Continued)

*Primary Examiner* — Cheikh T Ndiaye

(57) ABSTRACT

An input media signal that carries input media content is received. The input media content is used to generate output media content in an output media signal. It is determined whether identification-and-timing (IAT) data is to be authored for the output media content. In response to determining that the output IAT data is to be authored for the output media content, output IAT data is authored for the output media content. At least a part of the output IAT data for at least a part of the output media content is encoded, along with the part of the output media content, into the output media signal. In some example scenarios, this output media signal then contains the IAT data and other related data for synchronization of additional media content with the output media content in content rendering/presentation operations.

26 Claims, 10 Drawing Sheets

(56) References Cited

U.S. PATENT DOCUMENTS

| | | | |
|---|---|---|---|
| 9,454,789 B2 | 9/2016 | Lord | |
| 2010/0272419 A1* | 10/2010 | Wang | G11B 27/105 |
| | | | 386/248 |
| 2013/0335629 A1* | 12/2013 | Laurent | H04N 21/44004 |
| | | | 348/515 |
| 2014/0019474 A1 | 1/2014 | Yamagishi | |
| 2015/0281763 A1* | 10/2015 | Bertrand | H04N 21/8133 |
| | | | 725/32 |
| 2016/0037189 A1* | 2/2016 | Holden | H04N 21/8358 |
| | | | 725/116 |
| 2016/0057317 A1* | 2/2016 | Zhao | H04N 5/08 |
| | | | 348/515 |
| 2016/0182973 A1 | 6/2016 | Winograd | |
| 2016/0212501 A1 | 7/2016 | Master | |
| 2016/0234542 A1* | 8/2016 | Stokking | H04N 21/4307 |
| 2016/0234570 A1* | 8/2016 | Van Deventer | H04N 21/4307 |
| 2017/0094341 A1 | 3/2017 | Berner | |
| 2018/0159909 A1* | 6/2018 | Huang | H04N 21/845 |

OTHER PUBLICATIONS

Franklin, Ryan "Using Metadata to Deliver Relevant and Valuable Content" Source: IBC 2016 Conference, Sep. 2016.
Kirk, R. et al "Efficient Workflows for Automated Rich Metadata Production" Source: IBC, Sep. 11-15, 2014.

* cited by examiner

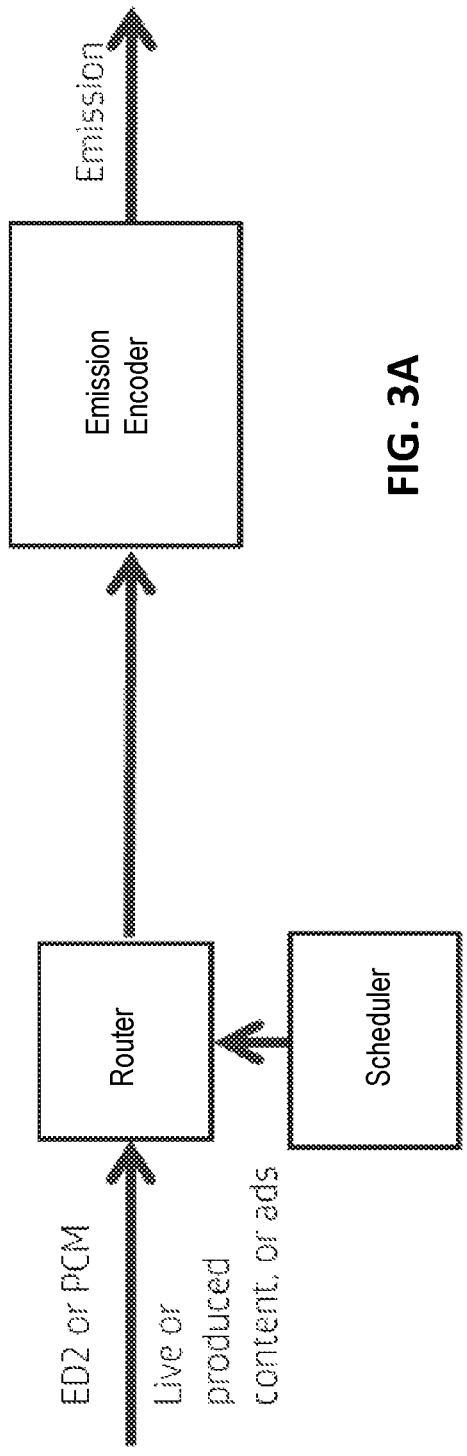
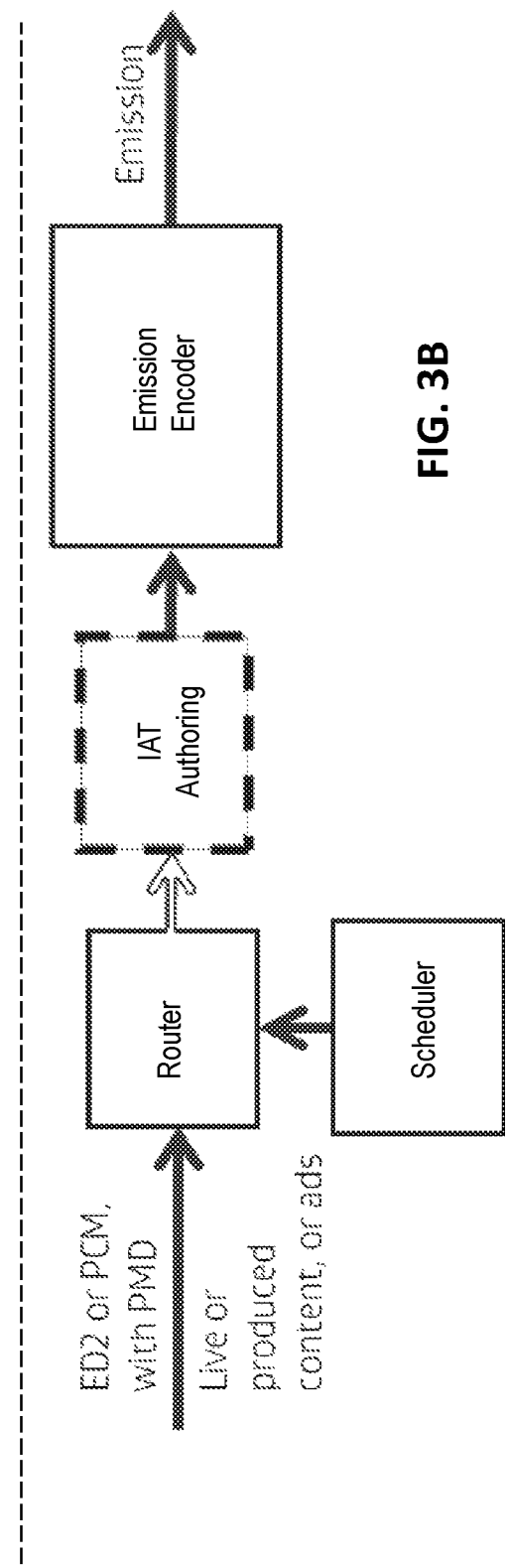
FIG. 3A
FIG. 3B

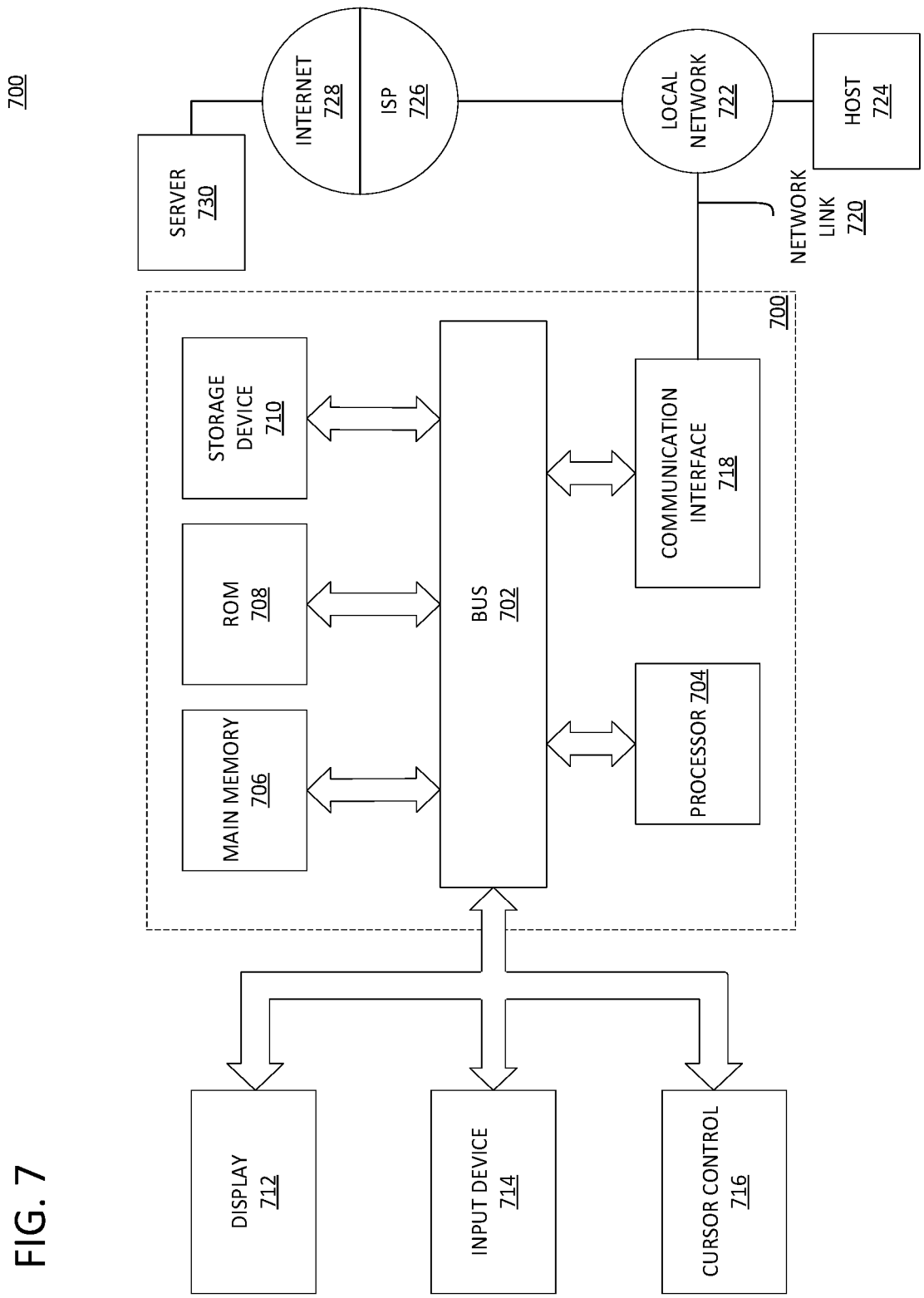

IDENTIFICATION AND TIMING DATA FOR MEDIA CONTENT

CROSS REFERENCE TO RELATED APPLICATIONS

This Application is related to Provisional U.S. Patent Application No. 62/528,404 filed on Jul. 3, 2017, the contents of which are hereby incorporated herein by reference for all purposes as if fully set forth herein.

TECHNOLOGY

The present invention relates generally to multimedia data, and in particular, to identification-and-timing (IAT) data for media content.

BACKGROUND

Human beings live in a world of "smart" devices. For example, high quality media devices with advanced networking and media processing capabilities are widely available. Multiple such devices may be available to a user at any given time. However, content delivery and consumption in many operational scenarios is still largely "dumb," as the advanced capabilities of the media devices are typically insufficiently tapped.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A and FIG. 3B illustrate example secondary media content insertion into primary media content;

FIG. 7 illustrates an example hardware platform on which a computer or a computing device as described herein may be implemented.

DESCRIPTION OF EXAMPLE EMBODIMENTS

Figure 1:
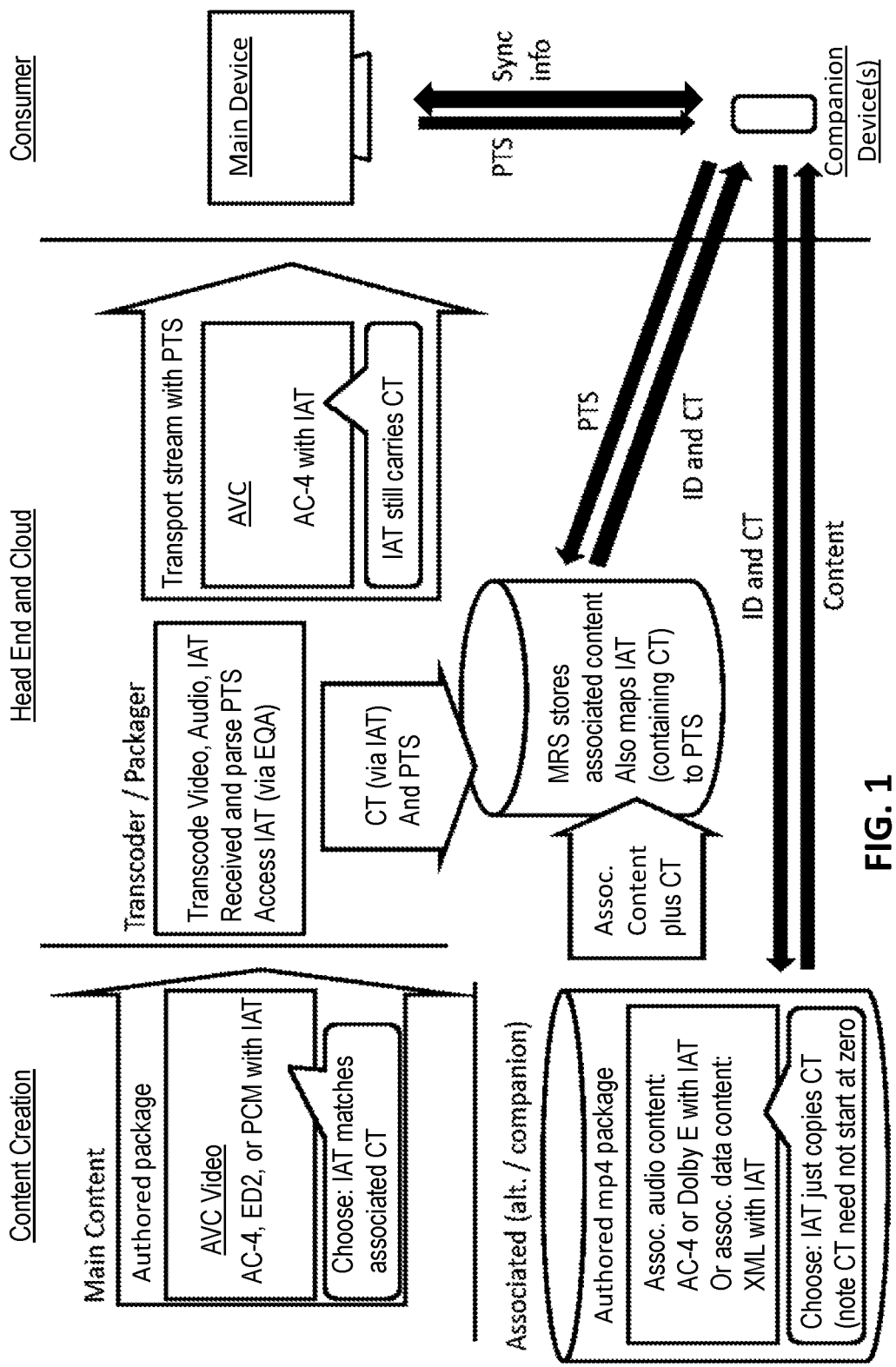
FIG. 1 and FIG. 2 illustrate example media emission systems that deliver/emit primary content to main devices and companion content to companion devices.

Example embodiments, which relate to IAT data for media content, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. NON-COMPOSITION TIMELINE
4. INSERTING OR REPLACING MEDIA CONTENT BASED ON IAT DATA
5. REGIONAL-SPECIFIC MEDIA CONTENT
6. ENDPOINT-SPECIFIC MEDIA CONTENT
7. INSPECTING AND INSERTING IAT DATA IN MEDIA FLOWS
8. DATA CONTAINERS AND CONSTRUCTS TO CARRY IAT DATA
9. TIMELINES
10. IAT CLOCK TICK RATE
11. PASSING IAT DATA TO OTHER LAYERS
12. IAT DATA TRANSCODING
13. TIMELINES OF ORIGINAL AND DERIVATIVE VERSIONS
14. TIMELINE INTERRUPTION
15. PRESENCE OF IAT DATA WITH MEDIA CONTENT
16. EXAMPLE ADDITIONAL DATA IN IAT DATA
17. EXAMPLE PROCESS FLOWS
18. IMPLEMENTATION MECHANISMS—HARDWARE OVERVIEW
19. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used to enable the growth of, access to, and synchronization of access and/or rendering/presentation of rich, time-based information, primary media content (e.g., a main media program, etc.), companion media content (e.g., alternative sound tracks, alternative natural languages, alternative viewing angles, etc.), auxiliary content, etc., which in turn enables novel, meaningful user experiences and content delivery solutions. At least some of the user experiences and media delivery solutions can be provided or supported through IAT data.

As used herein, an IAT message in the IAT data carries timing data indicating a precise time point in a timeline of a media content item for a media frame or a media sample therein in the media content item for which authoritative content identification information is given in preceding IAT messages or the (current) IAT message. The content identification information for the media content item originally may be specified by an upstream device, an author/creator, etc., and which is protected from corruption between the point of specification of the content identification information and the point of content emission/consumption.

The IAT data may represent a small amount of media metadata that flows with media content data such as audio content data and video content data. The IAT data may be used to uniquely identify a media content item. For example, an IAT message in the IAT data may be "Game of Thrones s3e1; 56.0000," which indicates both a unique piece of content ("Game of Thrones season 3 episode 1") as well as how far into that content the IAT message is (e.g., 56 seconds in). This may be up to a media sample accuracy, or greater. This time quantity may also be expressed as a media frame such as an audio frame or a video frame in a media content item, or a fraction thereof (e.g., below the 240 kHz resolution, though other numbers other than 240 kHz are possible).

IAT data as described herein can be used to facilitate creation, delivery, and synchronized consumption of media content items that are associated with the IAT data, whether the IAT data is available or authored at the time of media content creation (e.g., a main program, etc.) or not. Practically, this means that the IAT data can be used to enable content consumption experiences such as personalized audio, interactive secondary media content (e.g., educational materials, announcements, advertisements, etc.), synchronized delivery and/or presentation of the associated media content (e.g., the primary media content, the secondary media content, etc.) to primary or companion displays, analyzing relevant data including but not limited to data related to the content consumption experience by some or all of a user population, a specific user type, etc.

In comparison with watermarking, the key advantages of IAT-based techniques as described herein are that IAT data can be processed with a relatively small latency and a relatively small memory space. The IAT data can be carried without modifying media content, in sharp contrast with watermarking, which embeds watermarks into media content by modifying the media content. As compared with automatic content recognition (ACR), IAT has a relatively low acquisition time, a relatively high timing accuracy, and a relatively low memory load. It should be noted, however, that IAT-based techniques can interoperate, or be compatible, with other approaches including but not limited to watermarking (e.g., SMPTE, ATSC, etc.), ACR, and so forth. Additionally, optionally or alternatively, under techniques as described herein, time data conversion can be implemented between different types and/or different formats of time data associated with media content items, including but not limited to IAT, watermarking, ACR, and so forth.

In some embodiments, a method comprises providing a multimedia system as described herein. In some embodiments, mechanisms as described herein form a part of a studio system, a content creator system, a cloud based content service system, a broadcast network operator system, an internet based system, a multimedia system, including but not limited to a handheld device, tablet computer, theater system, outdoor display, game machine, television, laptop computer, netbook computer, cellular radiotelephone, electronic book reader, point of sale terminal, desktop computer, computer workstation, computer kiosk, PDA and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1 illustrates an example media emission system that delivers/emits primary content to a main (or primary) device such as a TV for rendering/presentation and delivers/emits companion content to one or more companion devices such as a smartphone for (e.g., audio, image, etc.) rendering/presentation that can, but is not necessarily limited to only, be synchronized with the (e.g., audio, image, etc.) rendering/presentation of the primary content with the main device.

By example of example but not limitation, the primary content may be a live or non-live media program (e.g., a main program, etc.) with or without a primary content audio mix, whereas the companion content may comprise audio, video, audiovisual data, or other media-related data such as additional scene information, alternative view of an event, a specific language audio track, auxiliary content, advertisements, and so forth, in relation to the primary content.

Under techniques as described herein, IAT data as described herein can be used as a basis (e.g., at runtime, etc.) to associate or correlate a timeline of the companion content (e.g., typically, most likely, etc.) represented in composition time (CT) with a timeline of the primary content also represented in CT and/or a timeline of delivery or emission of the primary content to the main device represented by transport stream timing data such as program time stamps (PTSs).

In some embodiments such as illustrated in FIG. 1, at a content creation stage, one or more first upstream devices generate authored packages that comprise the primary content (denoted as "Main Content") and the companion content (denoted as "Associated (alt./companion)") with respective IAT data.

The first upstream devices may package the primary content in an authored package as AVC video and audio encoded in a media coding format such as AC-4, ED2, PCM, MPEG-H, and so forth. The authored package carries primary content IAT data that matches associated CT specific to (e.g., media frames in, media samples in, etc.) the primary content.

The associated CT represented in the primary content IAT data forms a timeline of audio, video or audiovisual content in the primary content. The timeline may represent a playback timeline as intended by a composer or creator of the primary content.

As used herein, associated CT for a media program can be defined/specified by a plurality of IAT messages in IAT data as described herein. An IAT message in the plurality of IAT messages in the IAT data may be a combination of a unique identifier/name assigned to the media program and a specific time point in a sequence of time points in a (e.g., playback, etc.) time duration covered by the media program; the specific time point indicates a playback time of a corresponding media frame or a corresponding media sample in the (playback) timeline (e.g., of the media program, of a content distribution channel such as a TV channel/station, etc.). An IAT message in the plurality of IAT messages in the IAT data may also comprise a specific time point in the sequence of time points but not the unique identifier/name in a simplified form if the unique identifier/name that has been delivered in previous IAT messages of the same timeline is still deemed to be valid (e.g., within a validity interval, before the timeline is reset by a timeline start code (or flag) indicating a different timeline of a different media program, etc.); the specific time point indicates a playback time of a corresponding media frame or a corresponding media sample in the (playback) timeline (e.g., of the media program, of a content distribution channel such as a TV channel/station, etc.). Thus, associated CT in IAT data for a media program may represent a timeline (e.g., an intrinsic timeline, a timeline created by a creator/author, a playback timeline, etc.) of the media program, regardless of which entity or which device in a media processing pipeline is involved in encoding, transcoding, decoding, or presenting media content carried in the media program.

In some embodiments, one or more second upstream devices, which may be the same as or different from the one or more first upstream devices, may create, store, and/or stream the companion content in relation to the primary content (e.g., separately, in combination, etc.) in an authored mp4 package as associated or alternative media content encoded in a media (or audio) encoding format such as AC-4, Dolby E, MPEG-H, and so forth. The authored mp4 package for the companion content comprises companion content IAT data. In an embodiment, the companion content IAT data carries the same (or duplicated) timeline of the primary content IAT data, and may be created/obtained by (e.g., simply, etc.) copying the same associated CT as carried with the primary companion content IAT.

Thus, the primary content IAT data in the authored package containing the primary content and the companion content IAT data in the authored mp4 package containing the companion content carry the same timeline in the form of the associated CT for the media program, regardless of which entity or which device in a media processing pipeline is involved in encoding, transcoding, decoding, or presenting the primary media content and the companion content.

In some embodiments, the first upstream devices may be a system that creates/composes the media program represented by the primary content from original source content (e.g., images and audio captured from live scenes or events, images and audio captured in a studio setting, etc.) and creates/generates the associated CT as an intended playback timeline for the media program.

In some other embodiments, the first upstream devices may be a content distribution system that receives the primary content and the associated CT for the media program, transcodes the primary content, and authors the primary content in the authored package containing the primary content along with the associated CT for the media program. In these embodiments, the associated CT (for the media program) outputted by the first upstream devices to a media emission system downstream such as illustrated in FIG. 1 may be the same as the CT (for the media program) received by the first upstream devices.

At runtime, a head-end (e.g., cable system operations, etc.) or cloud-based (e.g., internet-based content providers, etc.) media emission system may be employed for delivering the primary content and the companion content to the main device and the companion devices for possible synchronized rendering or presentation of the primary content and the companion content with the main device and the companion devices. In some embodiments, the media emission system comprises a primary (content) emission encoder (denoted as "transcoder/packager") and a material resolution server (denoted as "MRS"). The media emission system, or components therein such as the primary emission encoder and the MRS, may be implemented by a single computing device or by multiple computing devices operating in conjunction with one another.

The primary emission encoder directly or indirectly receives the authored package for the primary content from any in a wide variety of content sources such as the one or more first upstream devices, a data repository, a premise-based or cloud-based content provider, and so forth; parses the primary content IAT data carried or stored in the authored package; parses incoming PTS data if any that is carried or embedded in underlying transport data units used to transport the authored package; transcodes the primary content decoded from the authored package into primary emission content with a video (e.g., denoted as "AVC", etc.) and audio (e.g., denoted as "AC-4", etc.) emission encoding format. The primary emission encoder encodes the primary content into primary emission content in a transport stream along with the primary content IAT data. The primary emission content refers to the primary content that has been specifically transcoded or encoded into an emission format supported by a media consuming recipient device such as the main device, a playback device, a TV, an end user device, and so forth.

Under techniques as described herein, while the primary content IAT data can be transcoded or resampled by an image processing pipeline as described herein for the purpose of complying with various encoding formats over various bitrates, the associated CT for the media program created or composed by the one or more first upstream devices is preserved faithfully (or intact) in the primary content IAT data encoded/embedded in the transport stream without alteration (but maybe subject to IAT data transcoding that does not impact semantic meanings of the timeline). It should be noted that the primary content IAT data can be transcoded; however, IAT data transcoding as described herein does not alter the timeline. The pre-transcoded IAT data and the post-transcoded IAT data represent the same timeline in terms of time points of media frames/samples as represented by the transcoded IAT data.

The transport stream may be outputted by the media emission system to the main device. Underlying transport data units (or transport layer packets/frames) in the transport stream may carry emission PTSs, which can be generated by the primary emission encoder using a clock source used by the media emission system or can be converted/modified from incoming (e.g., non-emission, etc.) PTSs in the parsed PTS data as previously mentioned.

In contrast with the associated CT in the IAT data for the media program, PTSs such as emission PTSs and/or the incoming PTSs are generated by an entity in a media processing pipeline with no regards to the (e.g., intrinsic, playback, composition-based, etc.) timeline of the media program as represented by the associated CT or the IAT data. For example, the emission PTSs may be generated by the media emission system to indicate a timeline of emission (or the transport stream) by the media emission system. Similarly, the incoming PTSs may be generated by an upstream device in relation to the media emission system to indicate a timeline of streaming (or an incoming transport stream) by the upstream device that provides the authored package and/or the authored mp4 package to the media emission system.

In an embodiment, the primary emission encoder that generates and outputs the transport stream with the emission PTSs to the main device provides the associated CT (e.g., the primary content IAT data, etc.), the emission PTSs, and/or other information in relation to the primary content, to the MRS.

In addition, the one or more second upstream devices provide (e.g., in real time, during an online session, during an offline session, etc.) the companion content, companion content identification data (denoted as "ID"), the companion content IAT data (with the associated CT), and/or other information in relation to the companion content, to the MRS. In some embodiments, (e.g., selected media frames in, selected media samples in, etc.) the company content accessible to the MRS may be indexed by the associated CT copied from that of the primary content and the companion content identification data.

In an embodiment, the MRS caches/stores the received information from the primary emission encoder such as the associated CT (or the primary content IAT data), the emission PTSs, and so forth, in computer memory or in a data repository. Additionally, optionally or alternatively, the MRS caches/stores the received information from the one or more second upstream devices such as the companion content, the companion content identification data, the associated CT (or the companion content IAT data), and so forth, in computer memory or in a data repository.

Based on some or all of the information received from the primary emission encoder and the one or more second upstream devices, the MRS is configured to determine, and/or generate, one or more first timeline mappings among, or between any two of, the timeline of the media program as represented by the associated CT, the timeline of the companion content as indexed by the associated CT, and the timeline of delivery/transport of the primary emission content to the main device as represented by the emission PTSs. For instance, the MRS can use the one or more first timeline mappings to determine a time point (e.g., in the timeline of the media program) in the primary content as represented in the associated CT of the media program and/or a time point (e.g., in the timeline of the media program) in the companion content as represented in the associated CT of the media program, based on a time point (e.g., in the delivery of the primary emission content to the main device, etc.) as represented (e.g., by one PTS, etc.) in the emission PTSs.

The main device and the companion devices may be communicatively linked with each other to exchange time synchronization information (denoted as "Sync info") so that the main device and the companion devices can establish or negotiate a common clock reference in their media rendering or presentation operations of the primary content (in the form of the primary emission content) and the companion content.

In some embodiments, while rendering/presenting the primary content, real-time timing information about the rendering or presentation of the primary content on the main device may be communicated by the main device to the companion devices as one or more emission PTSs. For example, when the main device is playing the primary content at a specific time point of the media program, a current timestamp (denoted as "PTS"), which may be a received emission PTS (from the primary emission encoder) corresponding to the specific time point of the media program, can be sent to some or all of the companion devices. The current timestamp may or may not be the same as a wall clock time as tracked by the main device and/or the companion devices, but rather may be an emission program time stamp in underlying transport data units generated by the primary emission encoder.

The companion devices may be operatively linked to the MRS via local and/or remote data connections. The MRS may send information about what companion content including but not limited to the companion content identification data received from the one or more second upstream devices is available for the primary content to the companion devices. Additionally, optionally or alternatively, the companion devices may receive some or all of the companion content identification data by way of another device (other than MRS) such as the main device.

While the companion devices (e.g., continuously, periodically, from time to time, at a plurality of time points at runtime, etc.) receive update of the timewise progress of the rendering/presentation of the primary content, any of the companion devices can send an inquiry request to the MRS to request for time information in any item of the companion content available for the primary content.

The inquiry request may use some or all of the companion content identification data (e.g., previously received from the MRS, received from the main device based on the IAT data received by the main device, etc.) to identify the companion content if there are more than one choice for the companion content. In addition, the inquiry request may comprise one or more emission PTSs (denoted as "PTS"), as received from the main device or from a device operating in conjunction with the main device. Responsive to the inquiry request, the MRS sends to the requesting companion device identifier(s) (denoted as "ID") of requested item(s) in the companion content and one or more corresponding CT time points (denoted as "CT") that index one or more specific time points in the requested companion content item(s). The MRS may use the first timeline mappings to determine the one or more corresponding CT time points respectively indexing the requested companion content item(s), based on the one or more emission PTSs in the inquiry request from the requesting companion devices and/or identification information for the requested companion content item(s) in the inquiry request from the requesting companion devices.

Based on the identifier(s) of the requested companion content item(s) and the one or more corresponding CT time points received from the MRS, the companion device may send a companion content request (denoted as "ID and CT") to the MRS for downloading or streaming the companion content of the media program. The companion content request may comprise one or more data fields including but not limited to any of data fields that identify some or all of: identifier(s) of companion content item(s) being requested for downloading or streaming, time information indicating the requested companion content item(s) starting at a specific starting CT time point (possibly with offsets or attendant time information accounting for any transmission or processing delays, etc.) is to be streamed or otherwise retrieved.

In some embodiments, the companion device can (e.g., dynamically, continuously, until a stop request is received, until the end of the companion content, etc.) download or obtain the requested companion content item(s) (denoted as "Content") and render some or all of the received companion content item(s) in synchronization with the rendering or presentation of the primary content with the main device.

3. Non-Composition Timeline

Figure 2:
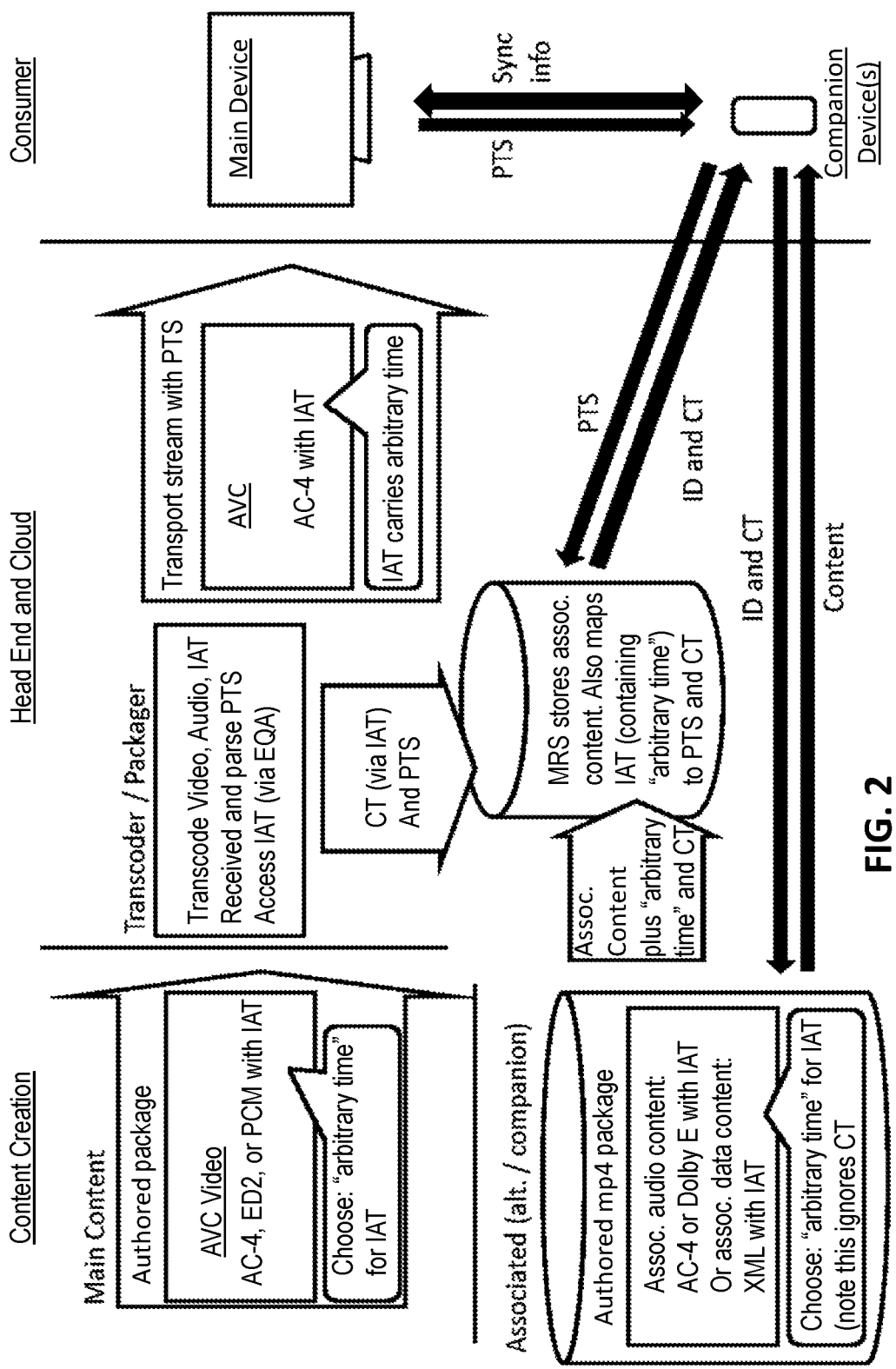

FIG. 2 illustrates an example media emission system that operates in the absence of a CT-based timeline for the media program represented in the primary content.

In some embodiments such as illustrated in FIG. 2, at a content creation stage, the one or more first upstream devices and/or the one or more second upstream devices receive (e.g., from a studio, from a media content source, etc.) the primary content and/or the companion content without the associated CT or the CT-based timeline for the media program represented in the IAT data for the primary content and/or copied in the IAT data for the companion content.

In response to determining that new IAT data (e.g., CT-based timeline, etc.) is to be generated/authored for the primary content, the one or more first upstream devices can proceed to generate a non-CT-based timeline for the primary content, and packages both the primary content (denoted as "Main Content") and the companion content (denoted as "Associated (alt./companion)") with respective IAT data containing the non-CT-based timeline.

By way of illustration but not limitation, the one or more first upstream devices may create, store, and/or stream the primary content in an authored package. In some embodiments, the authored package carries primary content IAT data that comprises the non-CT-based timeline (denoted as "arbitrary time"). The non-CT-based timeline may or may not be a timeline of audio, video or audiovisual content in the primary content as would be intended for playback by a content creator of the media program represented by the primary content. The non-CT-based timeline of the primary content can be defined/specified by a plurality of IAT messages in the IAT data for the primary content. An IAT message in the plurality of IAT messages in the IAT data may be a combination of a unique identifier/name assigned (e.g., by the one or more first upstream devices, etc.) to the media program and a specific time point in a sequence of time points in a (e.g., playback, etc.) time duration covered by the media program; the specific time point indicates a playback time of a corresponding media frame or a corresponding media sample in the (playback) timeline (e.g., of the media program, of a content distribution channel such as a TV channel/station, etc.). An IAT message in the plurality of IAT messages in the IAT data may also comprise a specific time point in the sequence of time points but not the unique identifier/name in a simplified form if the unique identifier/name that has been delivered in previous IAT messages of the same timeline is still deemed to be valid (e.g., within a validity interval, before the timeline is reset by a timeline start code indicating a different timeline of a different media program, etc.); the specific time point indicates a playback time of a corresponding media frame or a corresponding media sample in the (playback) timeline (e.g., of the media program, of a content distribution channel such as a TV channel/station, etc.). Thus, like the CT-based timeline, the non-CT-based timeline in IAT data for the media program may represent a timeline of the media program, regardless of which entity or which device in a media processing pipeline downstream in relation to the one or more first upstream devices is involved in encoding, transcoding, decoding, or presenting media content carried in the media program.

The one or more first upstream devices may (e.g., autonomously, etc.) generate/assign an identifier to the primary content and generate the non-CT-based timeline for the primary content based on a reference clock source accessible to the one or more first upstream devices, which may or may not related to any clock source present at the composition/creation time of the media program represented in the primary content.

The one or more second upstream devices generate an authored mp4 package for the companion content. In an embodiment, the one or more second upstream devices include, in the authored mp4 package, companion content IAT data that carries the same (or duplicated) non-CT-based timeline as the primary content IAT data carries. The companion content IAT may copy the same non-CT-based timeline as carried with the primary companion content IAT.

Thus, the companion content IAT data in the companion content and the primary content IAT data for the primary content carry the same timeline in the form of the non-CT-based timeline. In some embodiments, the non-CT-based timeline may be unaltered/preserved regardless of which entity or which device, downstream in relation to the one or more first upstream devices in a media processing pipeline, is involved in encoding, transcoding, decoding, or presenting media packages containing the media program.

In some embodiments, the one or more first upstream devices may be a content distribution system that receives the primary content without any associated CT for the media program, transcodes the primary content, and packages the primary content in the authored package containing the primary content along with the non-CT-based timeline.

At runtime, the primary emission encoder directly or indirectly receives the authored package for the primary content from any in a wide variety of content sources such as the one or more first upstream devices, a data repository, a premise-based or cloud-based content provider, and so forth; parses the primary content IAT data carried or stored in the authored package; parses incoming PTS data if any that is carried or embedded in underlying transport data units used to transport the authored package; transcodes the primary content decoded from the authored package into primary emission content with a video (e.g., denoted as "AVC", etc.) and audio (e.g., denoted as "AC-4", etc.) emission encoding format. The primary emission encoder encodes the primary content into primary emission content in a transport stream along with the primary content IAT data.

Under techniques as described herein, while the primary content IAT data can be transcoded or resampled by an image processing pipeline as described herein for the purpose of complying with various encoding formats over various bitrates, the non-CT-based timeline generated by the one or more first upstream devices is preserved faithfully (or intact) in the primary content IAT data encoded/embedded in the transport stream without alteration (but maybe subject to IAT data transcoding that does not impact semantic meanings of the timeline).

Underlying transport data units (or packets/frames) in the transport stream may carry emission PTSs, which can be generated by the primary emission encoder using a clock source accessible to the primary emission encoder or can be converted/modified from incoming PTSs in the parsed PTS data as previously mentioned. The emission PTSs may be generated by the media emission system to indicate a timeline of emission (or the transport stream) by the media emission system. The incoming PTSs may be generated by an upstream device in relation to the media emission system to indicate a timeline of streaming (or an incoming transport stream) by the upstream device that provides the authored package and/or the authored mp4 package to the media emission system.

In an embodiment, the primary emission encoder that generates and outputs the transport stream with the emission PTSs to the main device provides the non-CT-based timeline (e.g., the primary content IAT data, etc.), the emission PTSs, and/or other information in relation to the primary content, to the MRS. In addition, the one or more second upstream devices provide (e.g., in real time, during an online session, during an offline session, etc.) the companion content, companion content identification data (denoted as "ID"), the companion content IAT data (with the non-CT-based timeline), a composition timeline of the companion content (denoted as "CT"), and/or other information in relation to the companion content, to the MRS. In some embodiments, (e.g., selected media frames in, selected media samples in, etc.) the company content accessible to the MRS may be indexed by the composition timeline of the companion content.

In an embodiment, the MRS caches/stores the received information from the primary emission encoder such as the non-CT-based timeline (or the primary content IAT data), the emission PTSs, and so forth, in computer memory or in a data repository. Additionally, optionally or alternatively, the MRS caches/stores the received information from the one or more second upstream devices such as the companion content, the companion content identification data, the companion content IAT data (or the non-CT-based timeline of the primary content), the composition timeline of the companion time, and so forth, in computer memory or in a data repository.

Based on some or all of the information received from the primary emission encoder and the one or more second upstream devices, the MRS is configured to determine, and/or generate, one or more second timeline mappings among, or between any two of, the non-CT-based timeline of the primary content, the composition timeline of the companion content, and the timeline of delivery/transport of the primary emission content to the main device as represented by the emission PTSs. For instance, the MRS can use the one or more second timeline mappings to determine a time point (e.g., in the non-CT-based timeline) in the primary content and/or a time point (e.g., in the composition timeline of the companion content) in the companion content, based on a time point (e.g., in the delivery of the primary emission content to the main device, etc.) as represented (e.g., by one PTS, etc.) in the emission PTSs.

The main device and the companion devices may be communicatively linked with each other to exchange time synchronization information (denoted as "Sync info") so that the main device and the companion devices can establish or negotiate a common clock reference in their media rendering or presentation operations of the primary content (in the form of the primary emission content) and the companion content.

In some embodiments, while rendering/presenting the primary content, real-time timing information about the rendering or presentation of the primary content on the main device may be communicated by the main device to the companion devices as one or more emission PTSs. For example, when the main device is playing the primary content at a specific time point of the media program, a current timestamp (denoted as "PTS"), which may be a received emission PTS (from the primary emission encoder) corresponding to the specific time point of the media program, can be sent to some or all of the companion devices. The current timestamp may or may not be the same as a wall clock time as tracked by the main device and/or the companion devices, but rather may be an emission program time stamp in underlying transport data units generated by the primary emission encoder.

The companion devices may be operatively linked to the MRS via local and/or remote data connections. The MRS may send information about what companion content is available for the primary content to the companion devices.

While the companion devices (e.g., continuously, periodically, from time to time, at a plurality of time points at runtime, etc.) receives update of the timewise progress of the rendering/presentation of the primary content, any of the companion devices can send an inquiry request to the MRS to request for time information in any item of the companion content available for the primary content.

The inquiry request may identify the companion content if there are more than one choice for the companion content. In addition, the inquiry request may comprise one or more emission PTSs (denoted as "PTS"), as received from the main device or from a device operating in conjunction with the main device. Responsive to the inquiry request, the MRS sends to the requesting companion device identifier(s) (denoted as "ID") of requested item(s) in the companion content and one or more corresponding CT time points (denoted as "CT") in the composition timeline of the companion content. The MRS may use the second timeline mappings to determine the one or more corresponding CT time points respectively indexing the requested companion content item(s), based on the one or more emission PTSs in the inquiry request from the requesting companion devices and/or identification information for the requested companion content item(s) in the inquiry request from the requesting companion devices.

Based on the identifier(s) of the requested companion content item(s) and the one or more corresponding CT time points received from the MRS, the companion device may send a companion content request (denoted as "ID and CT") to the MRS for downloading or streaming the companion content of the media program. The companion content request may comprise one or more data fields including but not limited to any of data fields that identify some or all of: identifier(s) of companion content item(s) being requested for downloading or streaming, time information indicating the requested companion content item(s) starting at a specific starting CT time point (possibly with offsets or attendant time information accounting for any transmission or processing delays, etc.) is to be streamed or otherwise retrieved.

In some embodiments, the companion device can (e.g., dynamically, continuously, until a stop request is received, until the end of the companion content, etc.) download or obtain the requested companion content item(s) (denoted as "Content") and render some or all of the received companion content item(s) in synchronization with the rendering or presentation of the primary content with the main device.

It has been described that the same timeline carried in the primary content IAT data can be used or copied in the companion content IAT data, whether the timeline is CT-based or non-CT-based. It should be noted that in other embodiments, the primary content IAT data and the companion content IAT data may carry different timelines. In these embodiments, the different timelines can be provided to the MRS, which may then reconcile different timelines and the emission timeline (e.g., emission PTSs), and establish timeline mappings among the different timelines including but not limited to the different timelines carried in the primary content IAT data and the companion content IAT data and the emission timeline carried in the underling transport data units. Thus, the MRS can have sufficient access to timeline-correlating information to map time points among or between these timelines at runtime.

In some embodiments, one or both of the primary content IAT data and the companion content IAT data may be sent or emitted to endpoint device(s) such as the main device, the companion devices, and so forth. Any of these recipient devices may make use of, or may be enabled by, the received IAT data (including but not limited to media content identification information and time information) to access online or offline media data or other information and perform further operations (e.g., rendering, presentation, interactions, etc.) with respect to the media data and/or the other information whose access is enabled by the received IAT data.

4. Inserting or Replacing Media Content Based on IAT Data

A few paradigms may be used by a media content distributor/provider to insert secondary media content (e.g., public announcements, advertisements, etc.) in primary media content (e.g., a media program, a live event broadcast, etc.). Some or all of these paradigms and/or further combinations thereof may use IAT data to help perform secondary media content insertion into the primary media content.

In a first paradigm, secondary media content can be inserted by the media content distributor/provider (e.g., DirecTV, broadcast network operators such as NBC or Fox, cable network operators such as Comcast, etc.) into the primary media content at a relatively high level (e.g., top level, the next level following the top level, etc.) in a hierarchical structure of a content distribution network. The secondary media content insertion can be made into media feeds that comprise the primary media content at a global level, at a continental level, at a national level, at an overall broadcast network level, at an overall broadband network level, and so forth. All endpoint devices (e.g., of all users or subscribers of the media content distributor/provider, etc.) that access the primary media content through these media flows receive the secondary media content that has been inserted into the media flows comprising the primary media content. Examples of endpoint devices may include, but are not necessarily limited to, any of: set-top boxes or STBs, user content receivers such as those receive content through antenna, and so forth.

In a second paradigm, the media content distributor/provider may operate a plurality of local (or regional) content distribution networks in an overall content distribution network, such as a plurality of local media broadcast networks in an overall (e.g., global, national, East Coast, West Coast, etc.) media broadcast network, a plurality of local media broadband networks in an overall (e.g., global, national, East Coast, West Coast, etc.) media broadband network, and so forth. Possibly different local secondary media content can be delivered to specific local content distribution networks in the overall content distribution network. For instance, specific local secondary media content can be inserted into an individual local content distribution network via a media flow splicer. In some embodiments, in response to determining that there is no specific local secondary media content available for the local content distribution network, the local content distribution network fallback to distribute or provide default secondary media content such as national-level secondary media content provided by an upstream device to the local content distribution network.

In a third paradigm, a plurality of endpoint devices operated by a plurality of users or subscribers of the media content distributor/provider can locally store/cache possibly different second media content on different endpoint devices in the plurality of endpoint devices. The secondary media content can be directly or indirectly downloaded or cached by the user devices from any in a variety of media content sources via any combination in a wide variety of media content access methods such as progressive satellite download, internet connection based download, and so forth. At runtime, IAT data can be used to signal to the endpoint devices to insert locally stored/cached secondary media content precisely at specific time points in a media flow.

FIG. 3A and FIG. 3B illustrate example secondary media content insertion into primary media content with and without IAT data in the first paradigm. More specifically, FIG. 3A illustrates example secondary media content insertion without IAT data, whereas FIG. 3B illustrates example secondary media content insertion with IAT data.

Examples of the primary media content may include, but are not necessarily limited to only, any of: live media content (e.g., a live concert, a live speech, a live sports event, etc.), produced media content (e.g., released by a movie studio, a comedy, a non-live TV show, etc.), and so forth. By way of example but not limitation, the secondary media content may be ads.

A media content router may receive input media content including but not limited to the primary media content and the secondary media content as media bitstreams or media files in one or more video signals/files (e.g., a national baseband signal, etc.) in one or more input media coding formats such as ED2, PCM, and so forth. In some embodiments, the media content router is operatively linked to a media content scheduler that maintains or otherwise has access to scheduling information (e.g., EPG comprising scheduling information for the primary media content, scheduling information for the secondary media content, a master schedule for both the primary media content and the secondary media content, foreknowledge of what should be coming up in media flow(s) to downstream endpoint device(s), etc.) for aligning included media content items in a media flow as described herein along a specific (e.g., implicit, explicit, etc.) overall timeline (which may be formed by concatenating individual content-item level timelines of the included media content items in the media flow) as specified or determined based on the scheduling information. Scheduling instructions can be sent by the media content scheduler to the media content router, and/or other devices operating in conjunction with the media content scheduler, to control the media content router to access or receive specific media content items including but not limited to the primary media content and the secondary media content. The schedule instructions received from the media content scheduler may be used by the media content router to carry out operations to schedule distinct media content items in the input media content including but not limited to the primary media content and the secondary media content into one or more media flows. As used herein, a media flow may comprise video, audio, metadata, and so forth.

In some embodiments as illustrated in FIG. 3A, the media content router routes the one or more media flows to one or more media emission encoders (e.g., Harmonic, Elemental, DP 591, etc.) for encoding the primary media content and the secondary media content into one or more media emission (e.g., output, etc.) signals in one or more media emission coding formats such as AC-4 and so forth. The one or more media emission signals in the media emission coding format can be delivered further downstream to endpoint devices operated by users or subscribers of the media content distributor/provider.

Some or all of the distinct media content items scheduled/included in the media flows may or may not contain IAT data. Thus, when the media flows are received by the media emission encoders, the media emission encoders may not be able to extract IAT data from the media flows for some or all of the distinct media content items represented in the media flows. Further, when the media emission signals are received by the endpoint devices, the endpoint devices may not be able to extract IAT data from the media emission signals for some or all of the distinct media content items represented in the media emission signals.

In some embodiments as illustrated in FIG. 3B, instead of directing routing the media flows to the media emission encoder, the media content router routes the one or more media flows to an IAT inserter (denoted as "IAT authoring") such as an IAT injector, an IAT reader/writer, etc. The IAT inserter generates one or more IAT inserted media flows in which all the distinct media content items in the one or more media flows carry their respective IAT data. The IAT inserter then outputs the one or more IAT inserted media flows to the one or more media emission encoders (e.g., Harmonic, Elemental, DP 591, etc.) for encoding the primary media content and the secondary media content into one or more IAT inserted media emission (e.g., output, etc.) signals in one or more media emission coding formats such as AC-4 and so forth. The one or more IAT inserted media emission signals in the media emission coding format can be delivered further downstream to endpoint devices operated by users or subscribers of the media content distributor/provider.

Thus, when the IAT inserted media emission signals are received by the endpoint devices, the endpoint devices can extract the respective IAT data for all of the distinct media content items represented in the media emission signals from the IAT inserted media emission signals.

In various embodiments, the IAT inserter can be implemented as a standalone device operating in conjunction with some or all of the media content router, the media content scheduler, the media emission encoders, and so forth.

In some embodiments, the IAT inserter may be operatively linked to the media content scheduler and receive the scheduling information for the included media content items in the media flows. In some other embodiments, the IAT inserter may not be operatively linked to the media content scheduler and/or may not receive the scheduling information for the included media content items in the media flows. The IAT inserter may automatically detect a transition or change from a preceding included media content item in a media flow as described herein to a current included media content item immediately following the preceding included media content item in the media flow based on changes in (e.g., in-band, etc.) media content data, metadata, etc., within the media flow without depending on any scheduling information received out-of-band in relation to the media flow.

A media content item in the input media content as received by the IAT inserter may or may not comprise specific IAT data (e.g., as a part of PMD metadata, etc.) for the media content item. Thus, for any given time-adjacent pair of media content items in the input media content, neither, either or both of the time-adjacent pair of media content items may have respective IAT data. For all of these possible cases, techniques as described herein can be used to ensure that a recipient device downstream in relation to the IAT inserter receives timeline(s) (e.g., one timeline for main media content to be consumed by a main device and one or more other timelines for companion content to be consumed by one or more companion devices, a single timeline for the primary media content and the secondary media content, etc.) that indicate cleanly a respective start time point and a respective end time point for each of all the distinct media content items in the IAT inserted media flows. For instance, the IAT inserter ensures that a timeline start code (e.g., an easily detectible framing sequence of specific hexadecimal or binary sequence such as "0xFFFF", a special binary sequence which a recipient device can detect as a start time point for a current media content item and thus be treated also as an end time point for a previous media content item immediately preceding the current media content item in the same timeline, etc.) is present or embedded at a starting location (e.g., the first audio frame, the first video frame, etc.) of the current (e.g., a new, etc.) media content item in the media flow (or the timeline corresponding to the media flow). Upon detecting the timeline start code in the IAT data at the starting location of the current media content item, the recipient device may terminate any previous IAT timeline for the previous media content item.

Additionally, optionally or alternatively, the IAT inserter begins a new serialized sequence of an IAT message at the first feasible frame of the current media content item, for example based on a ceiling bitrate available for encoding the IAT data in the media content item. For instance, if the new serialized sequence of the IAT message would take up available bits from three frames at the ceiling bitrate available for encoding the IAT data, then the first feasible frame at which the new serialized sequence of the IAT message is the fourth frame of the current media content item. In some embodiments, the IAT message may represent a time point in the timeline of the current media content item that corresponds to the first sample in the fourth frame.

In respond to determining that there is no IAT data for a media content item, the IAT inserter can author IAT data. The IAT inserter may indicate that a CT based timeline was not available and that the authored IAT data is generated by a device that is not a compositor or a creator of the media content item.

5. Regional-Specific Media Content

Figure 4A:
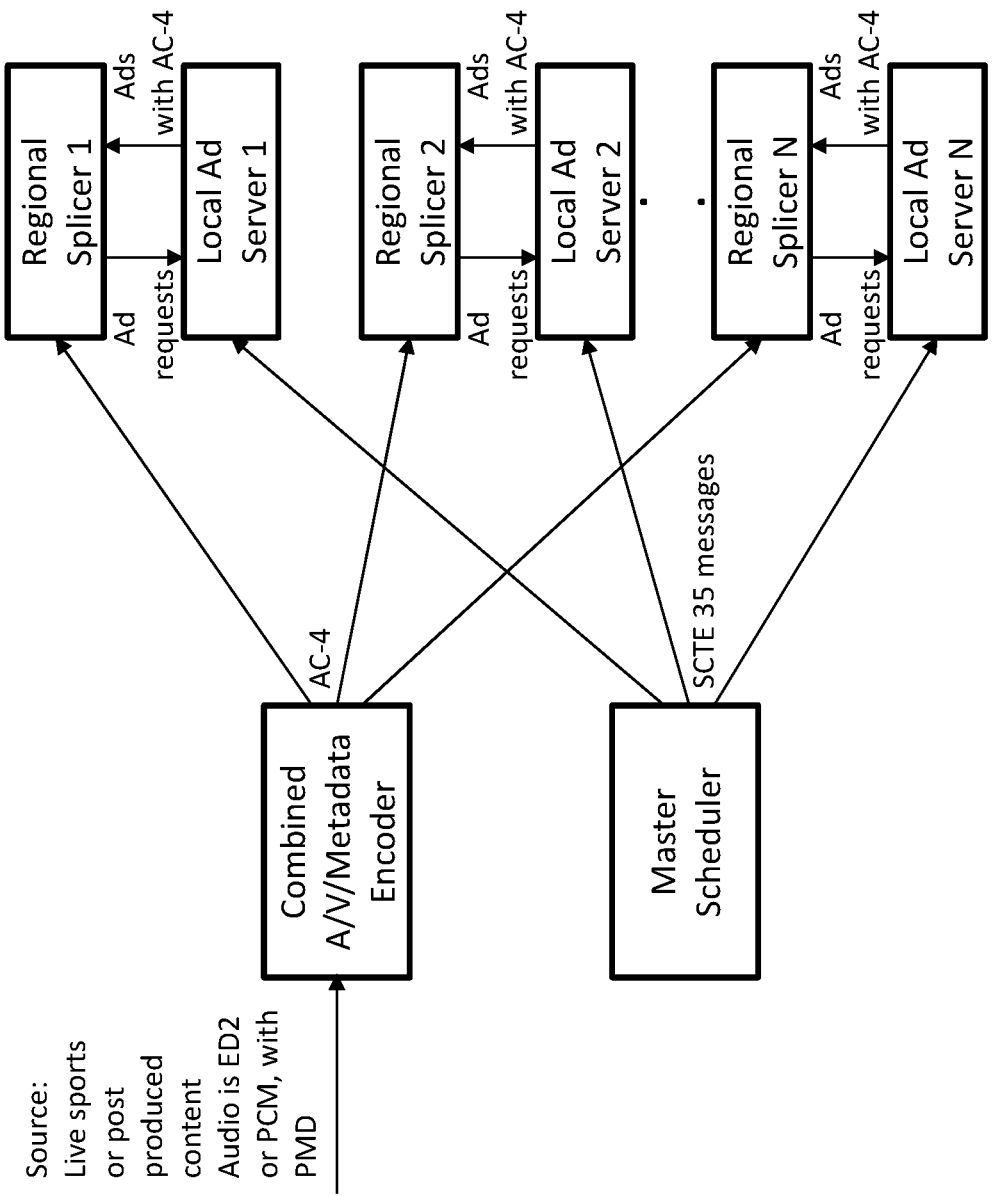
FIG. 4A illustrates example locality-dependent secondary media content insertion into primary media content.

FIG. 4A illustrates example local (or regional) secondary media content insertion into primary media content in the second paradigm. In some embodiments, server-side media flow splicers (e.g., "Splicer 1," "Splicer 2," ... "Splicer N," etc.) may be used to insert local secondary media content (and/or local primary media content) such as local news flashes, local ads, local announcements, and so forth, into the primary media content in media flow(s) to endpoint devices.

Server-side splicer local content insertion as described herein may, but is not necessarily limited to only, be implemented by an operator such as Comcast, AT&T, and so forth, of a media distribution network (e.g., a cable network, etc.) where there is a single combined A/V/metadata encoder that generates media flows to downstream devices such as the media flow splicers (e.g., "Splicer 1," "Splicer 2," ... "Splicer N," etc.). In some embodiments, the combined encoder is not used for encoding (or inserting) the local secondary media content into the media flows. The combined encoder receives input media content including but not limited to the primary media content and/or non-local (e.g., global, national, network-wide, etc.) secondary media content as media bitstreams or media files in one or more video signals/files (e.g., a national baseband signal, etc.) in one or more input media coding formats such as ED2, PCM, and so forth.

In some embodiments, the media content router is operatively linked to a media playout server that provides the input media content such as live media content streams like sports events, post produced media content, post produced programs, the primary media content, the non-local secondary media content, and so forth, to the combined encoder.

The media playout server may be operatively linked to a (master) media content scheduler that maintains or otherwise has access to scheduling information (e.g., EPG comprising scheduling information for the primary media content, scheduling information for the secondary media content, a master schedule for both the primary media content and the secondary media content, foreknowledge of what should be coming up in media flow(s) to downstream endpoint device(s), etc.) for aligning included media content items in the input media content as described herein along a specific (e.g., implicit, explicit, etc.) overall timeline (which may be formed by concatenating individual content-item level timelines of the included media content items in the input media content) as specified or determined based on the scheduling information.

In some embodiments, the combined encoder encodes the primary media content and the secondary media content into one or more media emission (e.g., output, etc.) signals in one or more media emission coding formats such as AC-4 and so forth. The one or more media emission signals in the media emission coding formats can be delivered further downstream to endpoint devices operated by users or subscribers of the media content distributor/provider.

Some or all of the distinct media content items scheduled/included in the input media content as received by the combined encoder may or may not contain IAT data. In some embodiments, the combined encoder ensures that all the distinct media content items in the one or more media emission signals carry their respective IAT data. Thus, when the media emission signals are received by the endpoint devices, the endpoint devices can extract, from the media emission signals, the respective IAT data for all of the distinct media content items represented in the media emission signals.

In some embodiments, the combined encoder may be operatively linked to the media content scheduler and receive the scheduling information for the included media content items in the input media content and/or the media emission signals. In some other embodiments, the combined encoder may not be operatively linked to the media content scheduler and/or may not receive the scheduling information for the included media content items in the input media content and/or the media emission signals. The combined encoder may automatically detect a transition or change from a preceding included media content item to be included in a media emission signal as described herein to a current included media content item immediately following the preceding included media content item in the media emission signal based on changes in (e.g., in-band, etc.) media content data, metadata, etc., within the input media content without depending on any scheduling information received out-of-band in relation to the input media content and/or the media emission signal.

A media content item in the input media content as received by the combined encoder may or may not comprise specific IAT data (e.g., as a part of PMD metadata, etc.) for the media content item. Thus, for any given time-adjacent pair of media content items in the input media content that are to be encoded into a media emission signal as described herein, neither, either or both of the time-adjacent pair of media content items may have respective IAT data. For all of these possible cases, techniques as described herein can be used to ensure that a recipient device downstream in relation to the combined encoder receives timeline(s) (e.g., one timeline for main media content to be consumed by a main device and one or more other timelines for companion content to be consumed by one or more companion devices, a single timeline for the primary media content and the secondary media content, etc.) that indicate cleanly a respective start time point and a respective end time point for each of all the distinct media content items in the (IAT inserted) media emission signal. For instance, the combined encoder ensures that a timeline start code (e.g., a framing sequence "0xFFFF", a special binary sequence which a recipient device can detect as a start time point for a current (e.g., a new, etc.) media content item and thus as an end time point for a previous media content item immediately preceding the current media content item in the same timeline, etc.) is present or embedded at a starting location (e.g., the first audio frame, the first video frame, etc.) of the current media content item in the media flow (or the timeline corresponding to the media flow). Upon detecting the timeline start code in the IAT data at the starting location of the current media content item, the recipient device may terminate any previous IAT timeline for the previous media content item.

Additionally, optionally or alternatively, the combined encoder begins a new serialized sequence of an IAT message at the first feasible frame of the current media content item, for example based on a ceiling bitrate available for encoding the IAT data in the media content item. For instance, if the new serialized sequence of the IAT message would take up available bits from three frames at the ceiling bitrate available for encoding the IAT data, then the first feasible frame at which the new serialized sequence of the IAT message is the fourth frame of the current media content item. In some embodiments, the IAT message may represent a time point in the timeline of the current media content item that corresponds to the first sample in the fourth frame.

In respond to determining that there is no IAT data for a media content item, the combined encoder can author IAT data. The combined encoder may use special code values and/or special data fields to indicate that a CT based timeline was not available and that the authored IAT data is generated by a device that is not a compositor or a creator of the media content item.

As illustrated in FIG. 4A, the combined encoder outputs three or more media emission signals respectively to three or more media flow splicers (e.g., "Splicer 1," "Splicer 2," . . . "Splicer N," etc.). These media flow splicers (e.g., "Splicer 1," "Splicer 2," . . . "Splicer N," etc.) may include one for each of several local regions, such as San Francisco, San Jose, Sacramento, and so forth. Each of the media flow splicers (e.g., "Splicer 1," "Splicer 2," . . . "Splicer N," etc.) can also separately receive input local media content including but not limited to local secondary media content from a respective local content server (e.g., "Local Ad Server 1," "Local Ad Server 2," . . . "Local Ad Server N," etc.). In some embodiments, these local content servers (e.g., "Local Ad Server 1," "Local Ad Server 2," . . . "Local Ad Server N," etc.) can be implemented as a single server that is configured to provide either different or identical media content to each (local or regional) media flow splicer (e.g., "Splicer 1," "Splicer 2," . . . "Splicer N," etc.) as shown in FIG. 4A. In some embodiments, the input local media content from a local content server (e.g., "Local Ad Server 1," "Local Ad Server 2," . . . "Local Ad Server N," etc.) is already emission-encoded, for example in a media emission coding format (e.g., AC-4, etc.) supported by downstream endpoint devices.

Consider an example in which the primary media content in a media emission signal as described herein generated and sent by the combined encoder to a local media flow splicer (e.g., "Splicer 1," "Splicer 2," . . . "Splicer N," etc.) as described herein is a show/episode "American Idol" as its main program. When a timeslot for local media content comes up in the media emission signal, the master scheduler (e.g., by way of the combined encoder in the media emission signal, etc.) sends a local media content timeslot message (e.g., an SCTE 35 message comprising its own PID in addition to video PID and audio PID, etc.). The timeslot message indicates a time point at which the timeslot is to begin and for how long. The timeslot message may be embedded in the media emission signal or sent out-of-band to the local media flow splicer (e.g., "Splicer 1," "Splicer 2," . . . "Splicer N," etc.) with some lead time, typically a few seconds. In response to receiving the timeslot message, the local media flow splicer (e.g., "Splicer 1," "Splicer 2," . . . "Splicer N," etc.) sends a local content request (or pings) its corresponding local content server (e.g., "Local Ad Server 1," "Local Ad Server 2," . . . "Local Ad Server N," etc.) to retrieve the local media content to be played back by endpoint devices in the timeslot. The local media content received by the local media flow splicer (e.g., "Splicer 1," "Splicer 2," . . . "Splicer N," etc.) from the local content server (e.g., "Local Ad Server 1," "Local Ad Server 2," . . . "Local Ad Server N," etc.) may be used by the local media flow splicer (e.g., "Splicer 1," "Splicer 2," . . . "Splicer N," etc.) to splice (e.g., by replacing a media data segment in the media emission signal from the combined encoder where the media data segment corresponds to the timeslot, etc.) the media emission signal. The spliced media emission signal that includes the local media content from the local content server (e.g., "Local Ad Server 1," "Local Ad Server 2," . . . "Local Ad Server N," etc.) is then sent to the endpoint devices.

Under other approaches that do not implement techniques as described herein, the local content server (e.g., "Local Ad Server 1," "Local Ad Server 2," . . . "Local Ad Server N," etc.) would need to provide the local media content of the right length corresponding to the timeslot, as the media flow splicer (e.g., "Splicer 1," "Splicer 2," . . . "Splicer N," etc.) would play the local media content no matter how long it is until the local media content ends or until the media flow splicer (e.g., "Splicer 1," "Splicer 2," . . . "Splicer N," etc.) receives another timeslot message (e.g., another SCTE 35 message informing either "come back when done with the current ad" or "come back right now," etc.) to interrupt the media flow splicer (e.g., "Splicer 1," "Splicer 2," . . . "Splicer N," etc.) from continuing splicing the local media content received from the local content server (e.g., "Local Ad Server 1," "Local Ad Server 2," . . . "Local Ad Server N," etc.) into the media emission signal. In the meantime, the combined encoder continues to send backup non-local media content in the (e.g., input, before splicing, etc.) media emission signal to the media flow splicer (e.g., "Splicer 1," "Splicer 2," . . . "Splicer N," etc.), which ignores the backup non-local media content in favor of the local media content received from the local content server (e.g., "Local Ad Server 1," "Local Ad Server 2," . . . "Local Ad Server N," etc.).

In contrast with these other approaches, under the techniques as described herein, the combined encoder ensures the IAT data inserted in the (e.g., input, before splicing, etc.) media emission signal to the media flow splicer (e.g., "Splicer 1," "Splicer 2," . . . "Splicer N," etc.) informs the media flow splicer (e.g., "Splicer 1," "Splicer 2," . . . "Splicer N," etc.) that the media flow splicer (e.g., "Splicer 1," "Splicer 2," . . . "Splicer N," etc.) is about to splice the media emission stream. For instance, an AC-4 encoder in the combined encoder can issue a timeline start code (or flag) in the IAT data in response to determining that there is a new media content item to be played starting at a specific time point. This timeline start code can be detected by the media flow splicer (e.g., "Splicer 1," "Splicer 2," . . . "Splicer N," etc.). In response, the media flow splicer (e.g., "Splicer 1," "Splicer 2," . . . "Splicer N," etc.) can stop splicing the local media content (item) that is being spliced into the media emission signal and prevent from spilling over the local media content (item) beyond the timeslot allocated for the local media content (item), for example into the main program such as "American Idol."

In operational scenarios in which a preceding local media content item is to transition to another local media content item, spilling over between the local media content items can also be prevented under techniques as described herein. For instance, the (e.g., input, before splicing, etc.) media emission signal such as an AC-4 bitstream may be authored by the combined encoder such that IAT data therein comprises a timeline end code (or the last IAT message for the current time line of the current media content item) at the end time point of a non-local media segment of the (e.g., input, before splicing, etc.) media emission signal that corresponds to the preceding local media content item for the purpose of closing off the timeline for the preceding local media content at its end. Additionally, optionally or alternatively, the (e.g., input, before splicing, etc.) media emission signal such as an AC-4 bitstream may be authored encoder such that IAT data therein comprises a timeline start code (or the first IAT message for a new time line of a new media content item) at the start time point of a non-local media segment of the (e.g., input, before splicing, etc.) media emission signal that corresponds to the current local media content item for the purpose of starting the timeline for the current local media content at its start.

In some embodiments, non-local media content items received by the combined encoder already have their timelines indicated by respective IAT data in the non-local media content items. For instance, the IAT data may indicate a timeline start code (or flag) for each of the non-local media content items. As a result, the IAT data can be preserved or faithfully transcoded by the combined encoder into the (e.g., input, before splicing, etc.) media emission signal. The media flow splicer (e.g., "Splicer 1," "Splicer 2," . . . "Splicer N," etc.) can use the IAT data to splice local media content items cleanly into the (e.g., spliced, output, etc.) media emission signal to be delivered to the endpoint devices. The IAT data may, but is not necessarily limited to only, be carried as frame-level metadata (which may be inspected by the media flow splicer). On the other hand, as previously stated, if there is no IAT data in the input media content, then the combined encoder can author or insert IAT data (e.g., specially marked IAT data or "blank IAT" to indicate that the IAT data is not created by a composer or creator, etc.).

6. Endpoint-Specific Media Content

Figure 4B:
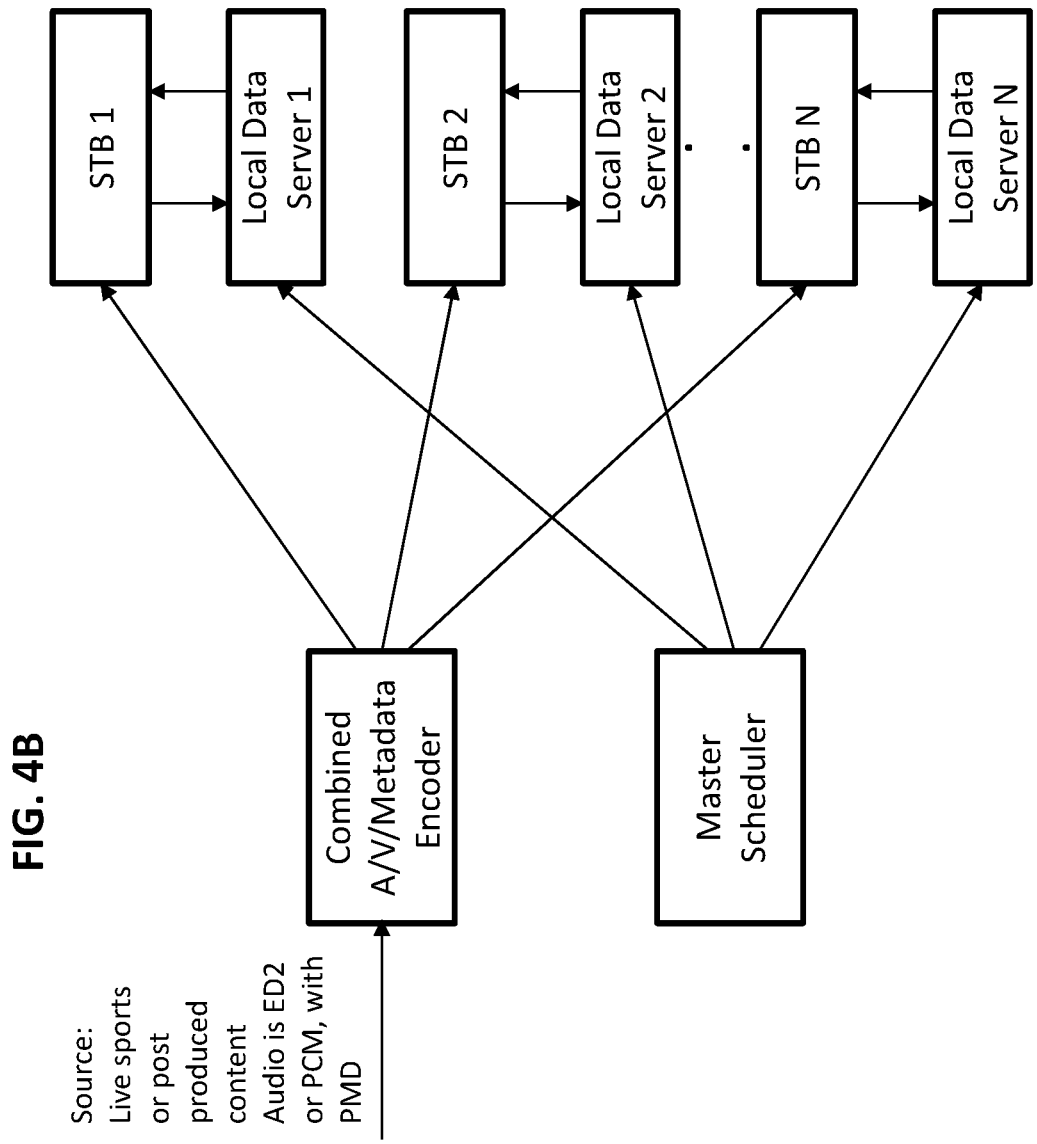
FIG. 4B illustrates example endpoint-specific secondary media content insertion into primary media content.

FIG. 4B illustrates example endpoint-specific secondary media content insertion into primary media content in the third paradigm. In some embodiments, an endpoint device such as STB (e.g., "STB 1," "STB 2," . . . "STB N," etc.) may be used to insert endpoint-specific secondary media content (and/or endpoint specific primary media content) such as those cached/downloaded/stored in a local data store accessible to the endpoint device into the primary media content received in a media emission signal to the endpoint device.

Endpoint content insertion as described herein may, but is not necessarily limited to only, be implemented by an operator such as Comcast, AT&T, and so forth, of a media distribution network (e.g., a cable network, a broadband network etc.) that generates the media emission signal to the endpoint device. In some embodiments, an upstream device in relation to the endpoint device is not used for encoding (or inserting) the endpoint-specific secondary media content into the media emission signal received by the endpoint device. The upstream device receives input media content including but not limited to the primary media content and/or non-endpoint-specific (e.g., global, national, network-wide, etc.) secondary media content as media bitstreams or media files in one or more video signals/files (e.g., a national baseband signal, etc.) in one or more input media coding formats such as ED2, PCM, AC-4, MPEG-H, and so forth.

In some embodiments, the upstream device is directly or indirectly operatively linked to one or more media content sources or media content repositories that provide the input media content such as live media content streams like sports events, post produced media content, post produced programs, the primary media content, the non-endpoint-specific secondary media content, and so forth, to the upstream device.

Media content items in the input media content may be aligned along a specific (e.g., implicit, explicit, etc.) overall timeline (which may be formed by concatenating individual content-item level timelines of the included media content items in the input media content), for example as specified or determined based on scheduling information as described herein.

In some embodiments, the upstream device encodes the primary media content and the secondary media content into the media emission (e.g., output, etc.) signal in a media emission coding format such as AC-4 and so forth. The media emission signal in the media emission coding format can be delivered to the endpoint device operated by a user or subscriber of the media content distributor/provider.

Some or all of the distinct media content items scheduled/included in the input media content as received by the upstream device may or may not contain IAT data. In some embodiments, the upstream device ensures that all the distinct media content items in the media emission signal carry its specific IAT data. Thus, when the media emission signal is received by the endpoint device, the endpoint device can extract, from the media emission signal, the respective IAT data for all of the distinct media content items represented in the media emission signal.

In some embodiments, the upstream device may be operatively linked to a media content scheduler and receive scheduling information for the included media content items in the input media content and/or the media emission signal. In some other embodiments, the upstream device may not be operatively linked to a media content scheduler and/or may not receive the scheduling information for the included media content items in the input media content and/or the media emission signal. The upstream device may automatically detect a transition or change from a preceding included media content item to be included in the media emission signal to a current included media content item immediately following the preceding included media content item in the media emission signal based on changes in (e.g., in-band, etc.) media content data, metadata, etc., within the input media content without depending on any scheduling information received out-of-band in relation to the input media content and/or the media emission signal.

A media content item in the input media content as received by the upstream device may or may not comprise specific IAT data (e.g., as a part of PMD metadata, etc.) for the media content item. Thus, for any given time-adjacent pair of media content items in the input media content that are to be encoded into the media emission signal, neither, either or both of the time-adjacent pair of media content items may have respective IAT data. For all of these possible cases, techniques as described herein can be used to ensure that the endpoint device downstream in relation to the upstream device receives timeline(s) (e.g., one timeline for main media content to be consumed by a main device and one or more other timelines for companion content to be consumed by one or more companion devices, a single timeline for the primary media content and the secondary media content, etc.) that indicate cleanly a respective start time point and a respective end time point for each of all the distinct media content items in the (IAT inserted) media emission signal. For instance, the upstream device ensures that a timeline start code (e.g., a framing sequence "0xFFFF", a special binary sequence which a recipient device can detect as a start time point for a current media content item and thus as an end time point for a previous media content item immediately preceding the current media content item in the same timeline, etc.) is present or embedded at a starting location (e.g., the first audio frame, the first video frame, etc.) of the current media content item in the media emission signal (or the timeline corresponding to the media emission signal). Upon detecting the timeline start code in the IAT data at the starting location of the current media content item, the endpoint device may terminate any previous IAT timeline for the previous media content item.

Additionally, optionally or alternatively, the upstream device begins a new serialized sequence of an IAT message at the first feasible frame of the current media content item, for example based on a ceiling bitrate available for encoding the IAT data in the media content item. For instance, if the new serialized sequence of the IAT message would take up available bits from three frames at the ceiling bitrate available for encoding the IAT data, then the first feasible frame at which the new serialized sequence of the IAT message is the fourth frame of the current media content item. In some embodiments, the IAT message may represent a time point in the timeline of the current media content item that corresponds to the first sample in the fourth frame.

In respond to determining that there is no IAT data for a media content item, the upstream device can author IAT data. The upstream device may use special code values and/or special data fields to indicate that a CT based timeline was not available and that the authored IAT data is generated by a device that is not a compositor or a creator of the media content item.

As illustrated in FIG. 4B, the upstream device outputs the media emission signal to three or more endpoint devices. These endpoint devices may be accessible to cached/downloaded/stored endpoint-specific media content. Each of the endpoint devices can also separately receive endpoint-specific media content including but not limited to endpoint-specific secondary media content from a respective data store.

Consider an example in which the primary media content in a media emission signal as described herein generated and sent by the upstream device to an endpoint device as described herein is a show/episode "American Idol" as its main program. When a timeslot for endpoint-specific media content comes up in the media emission signal, a master scheduler (e.g., by way of the upstream device in the media emission signal, etc.) sends an endpoint-specific media content timeslot message (e.g., an SCTE 35 message comprising its own PID in addition to video PID and audio PID, etc.). The timeslot message indicates a time point at which the timeslot is to begin and for how long. The timeslot message may be embedded in the media emission signal or sent out-of-band to the STB (e.g., "STB 1," "STB 2," . . . "STB N," etc.) with some lead time, typically a few seconds. In response to receiving the timeslot message, the STB (e.g., "STB 1," "STB 2," . . . "STB N," etc.) retrieves the endpoint-specific media content from a local content data store (e.g., "Local Data Store 1," "Local Data Store 2," . . . "Local Data Store N," etc.) to be played back by the endpoint device in the timeslot and causes the endpoint-specific media content to be rendered in the timeslot.

Under other approaches that do not implement techniques as described herein, the endpoint device might cause the playback of the endpoint-specific media content to spill over into the main program in the media emission signal.

In contrast with these other approaches, under the techniques as described herein, the upstream device ensures the IAT data inserted in the (e.g., input, before splicing, etc.) media emission signal to the endpoint device informs the endpoint device of precise and specific start and end time points for the timeslot. For instance, the upstream device or a device operating in conjunction with the upstream device can issue a timeline start code (or the first IAT message for a new time line of a new media content item) in the IAT data in response to determining that there is a new media content item to be played starting at a specific time point. This timeline start code can be detected by the endpoint device. In response, the endpoint device can cause the playback of the endpoint-specific media content (item) to stop and prevent the endpoint-specific media content (item) from spilling over beyond the timeslot allocated for the endpoint-specific media content (item), for example into the main program such as "American Idol."

In operational scenarios in which a preceding endpoint-specific media content item is to transition to another endpoint-specific media content item, spilling over between the endpoint-specific media content items can also be prevented under techniques as described herein. For instance, the media emission signal such as an AC-4 bitstream may be authored by the upstream device or a device operating in conjunction with the upstream device such that IAT data therein comprises a timeline end code (or the last IAT message for the current time line of the current media content item) at the end time point of a non-endpoint-specific media segment of the media emission signal that corresponds to the preceding endpoint-specific media content item for the purpose of closing off the timeline for the preceding endpoint-specific media content at its end. Additionally, optionally or alternatively, the media emission signal such as an AC-4 bitstream may be authored encoder such that IAT data therein comprises a timeline start code (or the first IAT message for a new time line of a new media content item) at the start time point of a non-endpoint-specific media segment of the media emission signal that corresponds to the current endpoint-specific media content item for the purpose of starting the timeline for the current endpoint-specific media content at its start.

In some embodiments, non-endpoint-specific media content items received by the combined encoder already have their timelines indicated by respective IAT data in the non-endpoint-specific media content items. For instance, the IAT data may indicate a timeline code (or flag) for each of the non-endpoint-specific media content items. As a result, the IAT data can be preserved or faithfully transcoded by the upstream device into the media emission signal. The endpoint device can use the IAT data to determine when to play back an endpoint-specific media content item in place of a non-endpoint-specific media content item in the same timeslot. The IAT data may, but is not necessarily limited to only, be carried as frame-level metadata (which may be inspected by the endpoint device). On the other hand, as previously stated, if there is no IAT data in the input media content, then the upstream device can author or insert IAT data (e.g., specially marked IAT data or "blank IAT" to indicate that the IAT data is not created by a composer or creator, etc.).

Techniques as described herein can be implemented in a wide variety of content distribution networks (e.g., DirecTV, Comcast, AT&T, etc.) such as broadcast networks, broadband networks, cable networks, satellite based networks, and so forth. IAT data as described herein can be inserted into media flows, media emission signals, media mezzanine signals, and so forth in a wide variety of different methods. For example, a first content distributor such as DirecTV may insert secondary media content all at its head end at a centralized location (e.g., El Segundo, etc.), whereas a second content distributor such as Comcast may insert regional secondary media content at regional locations. More specifically, the second content distributer (or Comcast in the present example) can deploy a separate media flow splicer in each locality or region. The IAT data may, but is not necessarily limited to only, be inserted by the second content distributor at the regional or local level. The first content distributor (or DirecTV in the present example) may generate a plurality of different West Coast and East Coast media flows (or feeds) at the centralized location. Each media flow in the plurality of media flow generated at the centralized location may include regional or local media content (e.g., local media content from a local NBC station, etc.). Each such media flow may be delivered to users or subscribers in a region or locality that corresponds to what is designated to be covered by each such media flow.

The term "emission" refers to a media processing point, in a content creation and/or delivery chain, where media content data and/or media metadata such as IAT data is encoded into a media signal, a media file, a media stream, etc., (with a media coding format denoted as "media emission format") to be delivered to endpoint device(s). The media content data and/or the media metadata such as the IAT data encoded in the media emission format can be accessed, read or processed by the endpoint device(s).

The term "mezzanine" refers to a media processing point in a content creation and/or delivery chain that is prior to emission point(s). A media mezzanine format (or a media mezzanine coding format) such as Dolby E (or ED2), PCM, and so forth, can be used for interchange (or contribution) to facilitate post production processes prior to emission. Mezzanine is typically associated with post-production. For instance, in a network operations center or a post-production facility, media processing devices/tools can media processing operations such as decoding from a first media coding format (e.g., Dolby E, etc.) to a second media coding format (e.g., PCM, etc.), editing or post processing, encoding to a third media coding format such as a media emission coding format, re-encoding back to the first media coding format (e.g., Dolby E in the present example, etc.) again, etc. Mezzanine may, but is not necessarily limited to only, be associated with a live distribution feed from a venue and the network operations center.

The terms "mezzanine" and "contribution" may be used interchangeably herein, unless specifically pointed out otherwise. The term "contribution" may refer to, without limitation, a media processing point, in the content creation and/or delivery chain, used for real time distribution of live TV programming For instance, a feed from the Super Bowl to the network operations center in the content creation and/or delivery chain may be referred to as a contribution that is to be reprocessed by one or more media processing points under control of the network operations center for distribution to a TV affiliate or a TV station, which can integrate the reprocessed contribution with local programming and emit the reprocessed contribution and the local programming to consumers in a media emission coding format.

In some embodiments, a presence and/or an author of specific media metadata such as IAT data can be indicated by an upstream in the content creation and/or delivery chain to a downstream device in the same chain. For example, one or more flags/indicators such as one or more universally unique identifiers (UUIDs), EIDR, Nielsen ID, Gracenote ID, Ad-ID, etc., may be carried in media signals, media files, media streams, etc., with the specific media metadata such as the IAT data.

Techniques as described herein can be used to ensure that IAT data flows through all media processing infrastructure in the content creation and/or delivery chain. In some embodiments, at a media processing point a time data convertor may be deployed to convert between the IAT data and other time data such as timelines used/authored/injected by other media processing components/devices in the content creation and/or delivery chain. For example, DASH time data may be used/authored/injected/emitted into a media signal, a media file, a media stream, etc., (e.g., at the emission point, etc. in the chain), and a time data convertor (e.g., deployed at the emission point, etc.) can be used to convert between the IAT data and the DASH time data (or timelines represented thereby). Additionally, optionally or alternatively, the time data convertor can be directly or indirectly operatively linked with a DASH server that issues or authors the DASH time data for the purpose of correctly interpreting DASH stamps (e.g., automatically generated by the DASH server based on software made by Microsoft, Apache, and others, etc.) and/or synchronizing timelines represented in the IAT data and the timelines represented in the DASH time data.

7. Inspecting and Inserting IAT Data in Media Flows

Figure 5A:
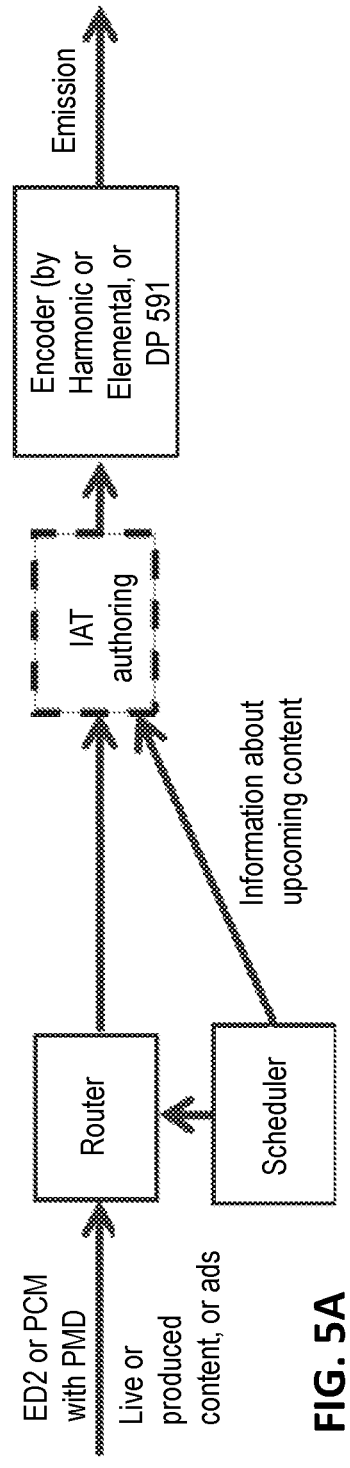
FIG. 5A through FIG. 5C illustrate example system configurations in which IAT data is present to indicate timelines in upcoming media content.
Figure 5B:
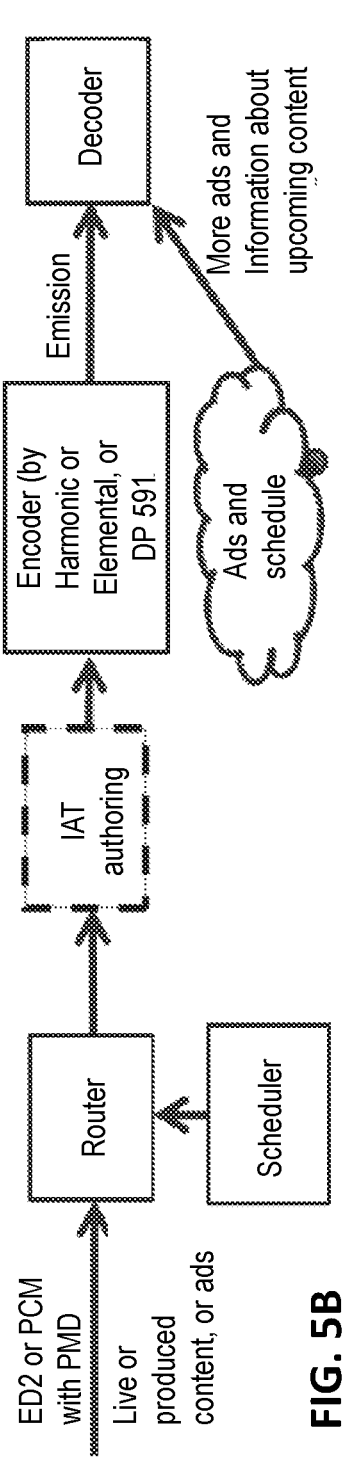
Figure 5C:
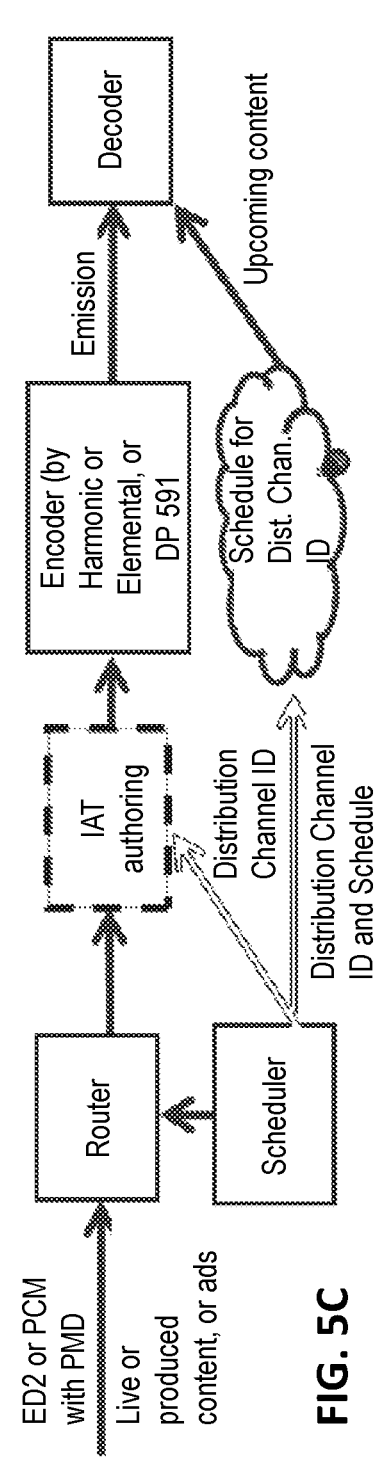

FIG. 5A through FIG. 5C illustrate example system configurations (or options) in which IAT data is present to indicate timelines in upcoming media content including but not limited to primary media content and secondary media content.

More specifically, FIG. 5A illustrates the first system configuration in which an IAT inserter is placed between a media content scheduler and a media content encoder to ensure presence of IAT data for all included media content data in media flows generated by the media content encoder.

The system configuration of FIG. 5A is similar to the system configuration of FIG. 3B. Whereas the IAT inserter of FIG. 3B may or may not receive from the media content scheduler scheduling information for included media content items in input media content received by the media content encoder, the IAT inserter of FIG. 5A receives from the media content scheduler scheduling information for included media content items in input media content received by the media content encoder. The scheduling information as received from the media content scheduler may be used by the media content encoder to precisely and reliably ensure respective IAT data such as IAT messages corresponding to start, intermediate, and end time points is generated for (e.g., all, etc.) the included media content items. As a result, media processing devices downstream in relation to the media content encoder can receive the IAT data and use the IAT data to insert additional media content, replace existing media content, render or present companion content synchronously or asynchronously, etc.

The system configuration of FIG. 5B provides an alternative to FIG. 4B for inserting endpoint-specific media content into scheduled (or signaled/designated) timeslots. As illustrated in FIG. 5B, an endpoint device (e.g., STB, etc.) may access scheduling information that specifies timing information of the scheduled timeslots into which the endpoint-specific media content can be rendered or presented in place of corresponding non-endpoint-specific media segments in a media emission signal received by the endpoint device. For instance, IAT data such as IAT messages links to external auxiliary content sources, etc., may be passed from lower layer(s) to higher layer(s) (e.g., from transport layer to application layer, etc.) in real time or in near real time in the endpoint device. The IAT data may be used to determine media content distribution and/or access information such as a specific TV station or a multichannel video programming distributor (MVPD) that delivers content to a specific region, which cloud-based service(s)/server(s) should be accessed for associated content, etc. The media content distribution and/or access information can be provided by layers such as that of a transport stream. Based at least in part on such information obtained from or through the IAT data, middleware implemented in the endpoint device may access the scheduling information from a scheduling information source such as a media content scheduler or a device operating in conjunction with the media content scheduler. The endpoint device may pre-fetch the schedule information and locally cache/store/download the endpoint-specific media content. Based on the schedule information and/or IAT data whose presence in the media emission signal is ensured by an upstream device such as an IAT inserter before a media emission encoder, the endpoint device can identify precise time points for the scheduled timeslots into which selected/scheduled endpoint-specific media content (items) locally cached/downloaded/stored with the endpoint device are retrieved and caused to be rendered or presented.

The system configuration of FIG. 5C represents a further refinement from the system configuration of FIG. 5B for inserting endpoint-specific media content into scheduled (or signaled/designated) timeslots in specific distribution channel(s). As illustrated in FIG. 5C, an endpoint device (e.g., STB, etc.) may access scheduling information that specifies distribution channel ID(s) of the specific distribution channel(s) and timing information of the scheduled timeslots (in the specific distribution channel(s)) into which the endpoint-specific media content can be rendered or presented in place of corresponding non-endpoint-specific media segments in media emission signal(s) received by the endpoint device that represent the specific distribution channel(s). For instance, the endpoint device may access the scheduling information from a scheduling information source such as a media content scheduler or a device operating in conjunction with the media content scheduler. The endpoint device may pre-fetch the schedule information and locally cache/store/download the endpoint-specific media content. Based on the schedule information and/or IAT data whose presence(s) in the media emission signal(s) are ensured by an upstream device such as an IAT inserter before a media emission encoder, the endpoint device can identify exact distribution channel ID(s), precise time points for the scheduled timeslots (in the distribution channel(s) as indicated by the distribution channel ID(s)) into which selected/scheduled endpoint-specific media content (items) locally cached/downloaded/stored with the endpoint device are retrieved and caused to be rendered or presented. In some embodiments, the schedule information that includes the distribution channel ID(s) may, but is not necessarily limited to only, represent one or more playlist(s) that exist on a cloud-based media content scheduling server.

8. Data Containers and Constructs to Carry IAT Data

Media content and metadata such as IAT data can be encoded, carried and delivered in a wide variety of media coding formats including but not limited to, PCM plus PMD (e.g., in a live streaming application, in a live broadcasting application, etc.), ED2, and so forth. For instance, both the media content (e.g., PCM audio, etc.) and the metadata can be carried as payloads within media content containers (e.g., audio frames, audio data blocks, etc.) in a media content signal. Both the media content and the metadata can be delivered to a downstream recipient device as the payloads of the media content containers over a data connection such as an AES3 data connection.

The downstream recipient device may transcode the payloads (e.g., the PCM audio in the present example, etc.) coded to an input sample rate to new payloads (or new PCM audio) coded to an output sample rate, causing corruption (e.g., unreadable, undefined, incorrect data values, etc.) to the metadata in some of the payloads, especially in live streaming or live applications as compared with non-live media files or non-live applications. To mitigate or avoid risks of such metadata corruption, media processing tools (e.g., those performing sample rate transcoding, etc.) along a media content creation and delivery chain may be specifically configured to inspect whether a media content container carries the media content (e.g., the PCM audio in the present example, etc.) or carries the metadata such as the IAT data, for example based on values set in audio header fields (e.g., SMPTE 337 audio header fields, etc.) in the media content containers. In response to determining that a media content container carries a portion of the metadata such as a portion of the IAT data, a media processing tool may transcode the metadata (e.g., with fewer IAT messages, with simplified versions of IAT messages, below a prevailing ceiling bitrate for coding the IAT data, etc.) in a way without corrupting the metadata.

In some embodiments, a ceiling bitrate available for encoding the IAT data may, but is not necessarily limited to only, correspond to a percentile (e.g., 5%, 6%, etc.) threshold IAT for a minimum data rate (e.g., 64 kbps, etc.). Additionally, optionally or alternatively, an IAT message may be sent as a partial instance with values for a subset of data fields; other values for other data fields beyond the subset of data fields as received from previous complete instances of IAT messages may be combined with the values for the subset of data fields to fully define/specify the content identification information and time points for corresponding media frames and/or media samples in the media content.

Some or all of IAT data as described herein may be inserted at various points along a media content creation and delivery chain. In some embodiments, IAT data may be carried in a wide variety of media content containers, metadata container, data containers, etc., and/or in a wide variety of media content constructs, metadata constructs, data constructs, media data coding syntax elements, and so forth. The term "container" may refer to a construct that contains or carries data objects. The term "construct" refers to a data type of a data object that may be carried in a container, etc.

Example containers to carry data objects such as related to IAT data may include, but are not necessarily limited to only, any of: EMDF, SAMOA (as will be further explained in detail in the later discussion), ADM (e.g., file based, etc.), independent Realtime Transport Protocol (RTP) stream as defined in AES67, etc.

Example constructs of data objects such as related to IAT data may include, but are not necessarily limited to only, any of: EMDF, PMD, ADM, PMD, etc. Example media coding formats with which IAT data can be carried may include, but are not necessarily limited to only, any of: media emission encoding formats such as AC-4 or MPEG-H, mezzanine encoding formats such as ED2, PCM, etc.

In a non-limiting implementation example, at an emission point (e.g., when sending a media emission signal to an endpoint device, etc.) in the media content creation and delivery chain, IAT data may be carried in a data container of a media emission signal in a media emission encoding format such as EMDF. At a non-emission point (e.g., upstream to the emission point, etc.) in the media content creation and delivery chain, IAT data may be carried in a mezzanine encoding formats such as ED2, PCM audio formats, and so forth.

As used herein, "EMDF" refers to a container, a construct, etc., in an extensible metadata framework (or Evo), that can be used to carry media metadata such as audio metadata for emission media content and the media metadata to endpoint devices. The container, the construct, etc., under the extensible metadata frame may be tailored to various time resolutions (e.g., every second, every few seconds, every few fractions of second, etc.) and/or various available bitrates for carrying the media metadata such as relatively low time resolutions and/or relatively low available bitrates.

The term "PMD" refers to a metadata construct in a media coding format such as ED2; PMD may be used in the content creation and delivery chain prior to (or upstream in relation to) the emission point. A PMD metadata construct may be a generally stripped down (or with relatively low overheads) metadata construct as compared an EMDF construct used in a media emission coding format. For instance, the EMDF construct may be considered as a superset data construct that can also carry other media metadata such loudness metadata, sound object locations, additional parameters that may or may not be contained in a PMD construct, and so forth.

The term "ADM" refers to Audio Definition Model. In some embodiments, an ADM container and/or construct can carry media metadata such as object audio metadata, IAT data, and so forth. The ADM container and/or construct can carry media metadata independent of (or without being coded specifically for) a codec such as non-live, file based audio metadata. For instance, the ADM container and/or construct or the media metadata therein can be associated with media content such as PCM-based media content data as a large data chunk in a way file (BWAV ADM). Additionally, optionally or alternatively, the ADM container and/or construct (e.g., a serialized version thereof, etc.) can carry media metadata for live media content.

In some embodiments, an Independent Realtime Transport Protocol (RTP) stream as specified in AES67 may be extended to allow an AES 67 container and/or construct (or stream) to have (e.g., generic, etc.) metadata buckets to carry media metadata such as IAT data in addition to media content payloads such as audio samples.

The term "SAMOA" refers to SMPTE 337 (encapsulation of SMPTE 336) Audio Metadata Over AES3 (pair). In some embodiments, a SMPTE 337 container can be used in a Dolby ED2 signal to carry or move media metadata (e.g., non-media content data, non-audio-content data, non-video-content data, etc.) such as PMD (which may, but is not necessarily limited to only, carry IAT data) through media processing infrastructure in the content creation and/or delivery chain. It should be noted that in various embodiments, IAT data may be carried in PMD-related containers and/or constructs as noted, but also may be carried in non-PMD containers and/or constructs. A SAMOA construct may be open ended (e.g., data in the SAMOA construct may spread across multiple frames, etc.), or may be frame based (e.g., data in the SAMOA construct may be within a single frame or a specific number of frames, etc.). In some embodiments, a SAMOA construct and/or container may comprise an author label identifying the author who creates some or all of the media metadata such as IAT data included in the SAMOA construct and/or container. In some embodiments, SAMOA is codec agnostic in that a SAMOA construct and/or container may be used to carry media metadata such as IAT data and non-IAT data from a variety of media metadata authors/sources over a media channel (e.g., an audio channel, etc.) represented in a media content signal that includes the SAMOA construct and/or container.

A SAMOA construct and/or container may be encoded into a (separate) SMPTE bitstream, which may not be inherently attached to an audio bitstream. Rather, the SAMOA construct and/or container may reference one or more media content streams such as one or more coded audio streams for which IAT data is carried as media metadata in the SAMOA construct and/or container. In this respect, the SAMOA construct and/or container differs from an EMDF construct and/or container in that the EMDF construct and/or container is attached (e.g., inherently, as a part, etc.) to a media content frame such as an AC-4 frame, a DD+ audio frame, and so forth. To associate the SMPTE bitstream with the one or more media content streams containing media content (e.g., essence, audio samples, video pixel values, etc.), a media processing unit that generates the SMPTE bitstream can insert or embed media content stream identification in the SMPTE bitstream (or the SAMOA construct and/or container therein) to establish logical links that point to the one or more media content streams containing the media content for which the IAT data is generated, authored, carried, transcoded, and/or emitted.

In some embodiments, the SAMOA construct and/or container can be used in the SMPTE bitstream to carry some or all of media metadata such as IAT data (e.g., content identifier, time points or codes, links to companion and/or other available content, etc.) along with AC-4 frames in the one or more media content streams if the media metadata could not be fit or carried in the AC-4 frames (or EMDF constructs and/or containers therein). Additionally, optionally or alternatively, in some embodiments, the SAMOA construct and/or container can be used in the SMPTE bitstream to carry some or all of media metadata such as IAT data along with media content such as audio carried in PCM, MPEG-H, DTS, AC-3, Dolby E and other formats. In various embodiments, the SMPTE stream or the media metadata therein may be time synchronized with the one or more media content streams or the media content and the media metadata in the PCM, MPEG-H, DTS, AC-3, Dolby E and other formats. Such time synchronization may be achieved at least in part via time synchronization information carried in (or reference one another among) these containers and/or constructs. In some embodiments, the media metadata in a container and/or construct such as the SAMOA container and/or construct may be preserved intact subject to sample rate transcoding along the content creation and/or delivery chain. Additionally, optionally or alternatively, some or all of the media metadata in one container and/or construct such as the SAMOA container and/or construct may be transformed into another container and/or construct such as the EMDF container and/or construct, or vice versa. The transformation and/or transcoding may change time resolutions of time points carried in the IAT data and available ceiling bitrates for carrying the IAT data without changing timelines as represented in the IAT data.

IAT-based techniques as described herein may include some or all of: carriage mechanisms, syntaxes for coding IAT data, IAT feature sets, tools to insert, inject, read, write, encode, transcode and decode IAT data, and so forth. Additionally, optionally or alternatively, the IAT-based techniques may be adapted to operate with a wide variety of related technologies such as content distribution networks (CDNs), user interfaces (UIs), tools for caching/storing/archiving media content data, (e.g., primary, companion, etc.) content authoring tools, content alignment tools (e.g., for defining/specifying what media content items are to be played back in series, in parallel, in part series in part parallel, etc.

In some embodiments, IAT data carries media content ID(s), time codes/points, distribution ID(s), and other (e.g., overhead, etc.) information. Some or all of the media content ID(s) and/or distribution ID(s) may be specified in coding formats with relatively minimal overhead as compared with the amount of media content data associated with the IAT data.

Carriage mechanisms such as data containers and/or data constructs related to a variety of media coding formats such as EMDF, Dolby Digital or DD, Dolby Digital Plus or DD+, AC-4, DAMF, TrueHD, MPEG AAC, MPEG HE-AAC, MPEG USAC, MPEG-H, DTS-HD, DTS-UHD, and so forth, may be used to carry the IAT data throughout a content creation and/or delivery chain.

The IAT data may comprise or specify a plurality of (e.g., evenly distributed, evenly spaced, unevenly distributed, unevenly spaced, etc.) time points/codes). In some embodiments, a time point/code specified in the IAT data may fall on a boundary of a media data sample such as an audio sample of 48 kHz audio content. A time resolution as represented by the plurality of time points specified in the IAT data may correspond to a frequency such as each sample in 48 kHz audio content, every second sample in 96 kHz audio content, every third sample in 192 kHz audio content, each sample in 96 kHz audio content, and so forth. A time point may, but is not limited to only, be represented by a clock time value associated with any in a variety of clock tick rates including a clock tick rate of 240 kHz that is compatible with all audio and video frame rates supported in DD+ and AC-4.

An IAT message comprising a combination of one or more media content identifiers and time point(s) in the IAT data may be carried in single media data frame in media coding format such as PCM, media mezzanine coding formats. Additionally, optionally or alternatively, the IAT message in the IAT data may be serialized over several media data frames in media coding formats such as media emission coding formats. A serialized sequence of the IAT message may be specifically authored such that an I-frame is used as an initial frame to carry the serialized sequence to minimize transcoding latency. In some embodiments, the IAT data may be coded below a ceiling bitrate, for example below a percentile of 5% of a data rate to carry media content data. Additionally, optionally or alternatively, a relatively large message size may be used to carry an IAT message as described herein, for example through serialization over multiple media content frames.

The IAT message can be transcoded at various points of the content creation and/or delivery chain without corruption (or misinterpretation). For example, content identifiers, links to media content or other information available for access by endpoint devices receiving the IAT message in the IAT data, etc., may be protected or maintained intact by such transcoding, even though the (input) time resolution as represented by the plurality of (input) time points in the IAT may be increased or decreased by such transcoding. In some embodiments, transcoded time points, which may be of a different time resolution from the input time resolution, represent the same timeline as measured by the plurality of input time points at the input time resolution in relation to a common reference clock or a common reference clock tick rate.

In some embodiments, IAT data may include version information with a minimal overhead (e.g., several bits, etc.) to indicate which specific version of coding format, containers, constructs, etc., should be used to interpret variety data objects, data fields carried with the IAT data. In some embodiments, the IAT data indicates timeline(s) of individual media content item(s). Additionally, optionally or alternatively, the IAT data indicates timeline(s) of individual content distributor(s) that distribute media content associated with the IAT data.

IAT data can be contemporaneously provided to an endpoint device to indicate a timeline for a current media content item that is being streamed, rendered and/or presented with the endpoint device. Additionally, optionally or alternatively, IAT data can be provided to an endpoint device in advance to indicate a timeline or a start time for an upcoming media content item that is to be streamed, rendered and/or presented with the endpoint device at a later time (e.g., starting from the start time, etc.).

As illustrated in FIG. 1 through FIG. 5, interrupted timelines of media content items (e.g., primary media content item, secondary media content item, an advertisement, etc.) may be managed (for example without special modifications to IAT syntax) by an upstream device such as an IAT inserter, which may be located in a cloud-based server. Additionally, optionally or alternatively, timelines for derivative versions of the same source media content item (e.g., a TV version edited for TV from a source media content item for cinema, etc.) may be managed (for example without special modifications to IAT syntax) by an upstream device such as an IAT inserter, which may be located in a cloud-based server.

In some embodiments, IAT data may comprise direct links or URL-type data field to allow endpoint devices or users thereof to access some or all of additional media content items and/or other information through the direct links or the URL-type data field.

In various embodiments, IAT data may be inserted at a content creation point, a mezzanine point, an emission point, etc., and may be inserted into data containers and/or data constructs used in conjunction with PCM coding formats, media mezzanine coding formats, media emission coding formats and so forth.

At various points of the content creation and/or delivery chain, an IAT capable decoder may be used to decode incoming IAT data, pass the incoming IAT data to relevant middleware, transcode the incoming IAT data into outgoing IAT data, pass the incoming IAT data (if not transcoded) to the next media processing device downstream, deliver the outgoing IAT data to the next media processing device downstream, etc.

IAT-based techniques as described herein can interoperate with a wide variety of components in a content creation and/or delivery chain, such as infrastructure components, middleware components, UI components, security related components, existing components, newly added components, and so forth, to implement standard and/or proprietary feature sets and technical specifications relating to IAT data. These techniques can be used in the content creation and/or delivery chain to support a wide variety of use cases (e.g., synchronized rendering/presentation of primary and companion content, precise timelines to support sequential and/or concurrent playing of multiple media content items, live and non-live applications, etc.) in a way that maximizes accuracy, minimizes latency, and offers the most seamless experience.

In some embodiments, IAT-based techniques can be used to support delivery-of-associated-content use cases. While streaming, emitting, rendering, and/or presenting main content, user and/or programming interfaces may be implemented to support (a) user interaction with primary or secondary media content (e.g., advertisements, shopping, etc.); (b) placements of media content or messages about "tappable" (e.g., suitable for incorporation, etc.) products; (c) information about actors or characters; (d) delivery of personalized audio such as alternative languages, alternate announcers, and/or directors' commentary; etc. Furthermore, the IAT data for the associated content can be authored with the main content or (additionally, optionally or alternatively) after the main content.

In some embodiments, IAT-based techniques can be used to support hybrid delivery use cases in which some media content is delivered in band (e.g., in a media signal, in a media file, in a media stream, etc.) and some media content is delivered out of band (e.g., out of the media signal, out of the media file, out of the media stream, etc.).

In some embodiments, IAT-based techniques can be used to support multiple-devices used cases. Main and/or associated content can be delivered to a single endpoint (or a single endpoint device) or multiple endpoints (or multiple endpoint devices) in sync.

In some embodiments, IAT-based techniques can be used to support big-data use cases. For instance, consumer behaviors may be analyzed by looking at usage patterns in IAT related use cases based at least in part on collected user data and IAT data that was used to support the use cases.

As compared with other approaches (e.g., baked-in metadata such as for closed captions, baked-in content such as for alternative languages, transport stream timing mechanisms, watermarking, ACR, etc.), techniques as described herein supports IAT referencing which allows effectively incorporating/accessing unlimited metadata (e.g., in contrast with the baked-in metadata, etc.) through a small amount of IAT data associated with media content data. The IAT data acts as reference(s) to additional (e.g., online, etc.) information that can be large and dynamically updateable. While the other approaches might author metadata (e.g., IMDB-style production information, etc.) into a media content pipe, the metadata would be non-updateable and limited in size.

IAT carries meaningful time bases (e.g., protected, maintained from an IAT authoring device that generates IAT data to endpoint devices receives the IAT data, etc.) and ID information (e.g., for identifying media content, etc.) as compared with transport stream time bases (e.g., PTP, PTS, etc.). For instance, PTP and PTS used in a network transport layer typically provide non-meaningful time bases, as the time bases change whenever a transport stream passes through one of multiple transport stream multiplexers. The transport stream time base also does not have meaningful IDs (e.g., for identifying media content, etc.), as different IDs are assigned to different streams of the same media content. These shortcomings in the transport stream time bases exist in time based under other approaches.

An IAT-based time base can be signaled or determined with relatively little latency and memory load without content modification in contrast with other approaches such as watermarking. For instance, watermarking could compromise (e.g., integrity in, etc.) media content. As watermarks are transmitted with a very low information data rate, relatively high latency and a relatively large memory footprint are needed for watermarking related algorithms Furthermore, embedding the watermarks in the media content causes irreversible content modification.

IAT data supports improved acquisition speed, timing accuracy, and small memory footprints as compared with other approaches such as ACR. While IAT data can identify media content (e.g., "American Idol," etc.) with high precision as the IAT data can be deliberately authored with little or no ambiguity, ACR may rely on fingerprint query results based on media fingerprints computed from media content data. Ambiguity (e.g., up to relatively high ambiguity, etc.) exists as to whether the media fingerprints are sufficiently robust and/or unique, whether media fingerprint algorithms extract the media fingerprints from a sufficiently unique media content portion, whether the fingerprint query results provide correct media content identification, and so forth. In addition, as other approaches such as ACR would likely provide media content identification with relatively high ambiguity, an actual owner of the media content would likely miss out receiving requests for secondary media content from users of endpoint devices, thereby likely further losing control over what user experience (UX) in connection with the media content could be provided to the users.

IAT data as described herein can provide intended timelines (e.g., in in-band metadata, etc.) without corruption from an IAT authoring point to endpoint devices, regardless of whether the IAT data is processed and/or delivered through or outside media codec(s). In contrast, metadata outside media codec(s) under other approaches such as DASH may not survive or may be corrupted from a metadata creation point to endpoint devices, as the (e.g., out-of-band, etc.) metadata outside media codec(s) would likely be relatively vulnerable to data corruption than metadata embedded with media containers/constructs associated with media content in a media signal, in a media file, in a media stream, etc. For example, DASH time data could be stripped at an intermediate point operated by a content distributor (e.g., Comcast, etc.), whereas IAT data would survive with no timeline corruption from the IAT authoring point to the endpoint devices.

As discussed, IAT data (or simply "IAT") is a small amount of metadata that allows for identification of, and sync with, media content with which IAT data flows. IAT data can be carried in a wide variety of media encoding formats that are not necessarily limited to those (e.g., Dolby audio formats, non-Dolby audio formats such as MPEG 1 layer 2 audio, video formats, etc.) related to specific vendors (e.g., Dolby Laboratories, Inc., etc.). One or more IAT components may be incorporated by media processing devices or infrastructure at one or more points throughout a content creation and/or delivery chain to create, carry, and deliver IAT data in and outside codecs from any specific vendors. Example IAT components may include, but are not necessarily limited to only, any of: authoring tools, encoder applications, transcoder applications, decoder applications, and so forth.

IAT-based techniques can be used to enable relevant media content consumption experiences with a wide variety of endpoint devices (or hardware components) and with a variety of content distribution networks (CDNs). IAT data may be authored/coded in compliance with specific IAT syntax into media metadata by one or more media processing devices at one or more points along the content creation and/or delivery chain (or pipeline). In a non-limiting example, IAT data can be authored/coded at a content post-production or content authoring point. In another non-limiting example, IAT data can be authored/coded at a point (e.g., an emission point, a point before and closed to the emission point, etc.) relatively close to end users or consumers of the media content. Additionally, optionally or alternatively, the IAT data can be authored/coded with two or more points along the content creation and/or delivery chain including but not necessarily limited to only the emission point, content post-production point, content creation point, and so forth.

IAT data can be used by media applications and/or media devices developed by a single vendor or by many different vendors. For example, a first media application and/or a first media device from a first vendor may author or code some or all of the IAT data, whereas a second different media application and/or a second different media device from a second different vendor may use and interpret some or all of the IAT data to support IAT-related user case(s) (e.g., accessing companion content, etc.). One or more media processing applications can be enabled by IAT data, including but not necessarily limited to only any of: hybrid delivery (e.g., Atmos audio, alternative dialogue, etc.), third party real time contribution (e.g., live alternative languages for streamed sports, etc.), companion content delivery (e.g., advertising links, interactive quizzes, information about actors, characters or athletes, etc.).

IAT inserters may be deployed to operate in conjunction with encoders, transcoders, etc., used for contribution and emission. IAT data can be inserted for media content (e.g., non-legacy media content, etc.) at a content authoring stage or point as well as for media content (e.g., legacy media content, etc.) at a content emission stage or point. An EMDF IAT inserter may be used to inspect, author transcode, and/or insert IAT data into EMDF-based data containers or constructs in media emission signals in media emission coding formats such as DD+, AC-4, non-Dolby coding formats such as MPEG 1 layer 2 audio, and so forth. A contribution IAT inserter may be used to inspect, author transcode, and/or insert IAT data in media content signals in media coding formats such as Dolby ED2, PCM+ professional metadata (PMD), non-Dolby coding formats such as MPEG 1 layer 2 audio, and so forth, at contribution point(s) where a content distributor that distributes media content to endpoint devices receives media content contributed from media content sources or live events.

A wide variety of endpoint devices such as consumer decoders (e.g., Dolby MS series decoders such as MS-12 decoder, Dolby Audio for Service Providers or DAS clients, non-Dolby decoders such as MPEG 1 layer 2 audio decoder, etc.) can implement IAT-related techniques to extract, read and/or even write some or all of IAT data (e.g., for interoperation with main and companion devices, etc.)

In some embodiments, multiple media emission coding formats may be supported concurrently or selectively. An emission IAT transcoder may be deployed at a media emission point to transcode input IAT data in a first media content signal in a first media emission coding format to output IAT data in a second different media content signal in a second different media emission coding format.

It has been described that IAT data can be inserted and consumed for media data at various points in a content creation and/or delivery chain (or pipeline). In various embodiments, IAT data may also be inserted and consumed for media data at various points before or after a content creation and/or delivery chain (or pipeline).

IAT-based techniques can operate in conjunction with a variety of asset management systems that archive and provide access to media content items as described herein. Additionally, optionally or alternatively, these techniques can operate in conjunction with a content service that maps (e.g., media content, etc.) IDs carried in IAT data to proper semantics (e.g., unique media content names/labels such as "American Idol" and "Fame of Domes" for a media content item, etc.). Based on the semantics, a time code/point such as "Fame of Domes, s3e1" carried in IAT data becomes a meaningful and specific location in a specific media content item (e.g., in "Frame of Domes" and not in companion or associated content, etc.). In some embodiments, the IDs carried in the IAT data may be mapped to the proper semantics based on a combination of intrinsic identification information carried in the IAT data and extrinsic identification/mapping function maintained at the content identification service that can be accessed by one or more media processing devices in the content creation and/or delivery chain. The IAT-based techniques as described herein can also operate with audio-video editing suites or applications to access or develop timelines in media content items modified by the audio-video editing suites or applications, and to encode/decode the media content items in various media signals, in media files, in media streams, etc., in various media coding formats.

IAT data includes some or all of: a unique identifier for the (associated) media content (item), time codes/points each of which indicates a specific time for a specific media sample (e.g., audio sample, video frame, etc.) in the media content, overheads (e.g., a cyclic redundancy check or CRC value, etc.) which provide robustness (e.g., data integrity, etc.) for the time codes/points, an identifier/label which indicates a distribution channel, and so forth. For some media coding formats (e.g., PCM and/or mezzanine coding formats, etc.), a full IAT message (e.g., comprising a content identifier, a time code/point and possibly other information, etc.) may be included in every media frame (e.g., audio frame, video frame, etc.). For some media coding formats (e.g., media emission coding formats, etc.), to carry IAT data below a relatively small ceiling bitrate (or data rate), an IAT message can be serialized over several consecutive frames, for example indicating a specific time for a media sample (e.g., the very first, etc.) in the last of the several media frames over which the IAT message is serialized. The choice to use the IAT message to indicate the specific time of the last media frame may reduce decoder latency and memory requirements, as an encoder (e.g., with lookahead buffers, with large computing power, with more media data availability, etc.) may be a better place to perform relatively complex processing to reduce latency on the decoder side. Additionally, optionally or alternatively, the specific time indicated by the IAT message may be for a media sample in a media frame that is not necessarily the last media frame; an offset may be indicated to point specifically to the media sample that is not at a default location such as the first media sample in the last media frame. A validity time duration (e.g., specified in the IAT message, specified in the IAT data, by default at an IAT data processor, etc.) may be used to validate whether the IAT message still validly represent an IAT timepoint and/or whether the IAT message should be ignored after too much time delay.

9. Timelines

IAT data as described herein may be used to represent or inform a variety of timeline types including but not necessarily limited to only any of: media program timelines, playlist timelines, content creator timelines, content distributor timelines, and so forth.

An example program timeline may include data field values (e.g., a textual equivalent of "Game of Thrones Season 3 episode 1 Original US English Version, 39 seconds in at this media data sample," encoded/encrypted in hash values, etc.) for indicating that "this ("Game of Thrones Season 3 episode 1 Original US English Version" in the present example) is the media program, and this is the amount of time (39 seconds in the present example) into that program." The content ID information ("Game of Thrones Season 3 episode 1 Original US English Version" in the present example) in the IAT data uniquely (e.g., fully, unambiguously, etc.) identifies a media program for which the IAT data carries the (media program) timeline.

An example playlist timeline may include data field values (e.g., a textual equivalent of "XYZ Channel 1-4, 9:14 pm and 15 seconds," encoded/encrypted in hash values, etc.) for indicating "I "XYZ" in the present example) am the distributor, this is the channel ("Channel 1-4" in the present example) I'm using, and here's my wall clock time ("9:14 pm and 15 seconds" in the present example) for this media data sample." The content ID information ("XYZ Channel 1-4" in the present example) in the IAT data may uniquely identify a content distributor and its distribution channel, but does not identify a specific media program being distributed in the distribution channel by the content distributor. In some embodiments, to deference the content ID in the playlist timeline into a specific media program, a cloud-based service/server may be accessed. Thus, in some embodiments, a playlist timeline may be transformed or dereferenced with external service(s)/server(s) into an equivalent media program timeline.

In some embodiments, data fields represented in the IAT data may or may not depend on where the IAT data is inserted or authored or what data connections (e.g., from endpoint devices, etc.) to related cloud-based servers are available. For instance, the IAT may at least include data fields for (e.g., media content) ID information and time information (e.g., time codes/points, etc.).

In some embodiments, a timeline (e.g., a playlist timeline, a media program timeline, etc.) as represented by IAT data may include data field values (e.g., a distribution channel ID, etc.) for future or upcoming media program(s), which for example are to be delivered in one of one or more distribution channels of a content distributor.

In some operational scenarios, indication of an upcoming media program in a distribution channel by the IAT data allows a recipient device to reduce or eliminate latency in playing back the upcoming media program or in accessing/playing back associated content related to the upcoming media program. For instance, a current media program (or primary media content) may be interspersed with secondary media content such as advertisements. IAT data may be used to indicate a timepoint (e.g., in a playback timeline, in a media program timeline, etc.) at which a segment of the media program is to end and an ad segment is to begin. Thus, the IAT data not only may indicate timeline information for the current media program currently playing, but also may indicate timeline information about the ad segment before the ad segment is actually being played. This allows fetching or accessing alternative or companion content for the ad in advance (e.g., a few seconds, a time interval estimated/set based on network and/or server processing and/or client processing latencies, etc.), for example by an endpoint device.

An upcoming media program (or a media content item such as an ad segment) may be indicated with a playlist timeline as carried in IAT data as described herein. A content distribution server can determine upcoming media content items in the playlist timeline following a current media program or following a current segment in the current media program, indicate the upcoming media content items in the IAT data being transmitted to endpoint device(s) while the current media content item or the current segment thereof is being streamed or transmitted, and stream companion content for the upcoming media content items ahead of time before the upcoming media content items are to be streamed or transmitted.

An upcoming media program (or a media content item such as an ad segment) may be indicated with a media program timeline as carried in IAT data as described herein. For instance, the IAT data may carry IAT data field values to indicate upcoming media content items such as "In 5 seconds, the next program will have ID number 12345 (corresponding to, for example a Citibank Ad), at 0 seconds in." Thus, an upstream device in relation to an endpoint device can determine upcoming media content items following a current media program or following a current segment in the current media program, indicate the upcoming media content items in the IAT data being transmitted to endpoint device(s) while the current media content item or the current segment thereof is being streamed or transmitted, and stream companion content for the upcoming media content items ahead of time before the upcoming media content items are to be streamed or transmitted.

In some embodiments, IAT data as described herein includes data field values (e.g., additional parameters added to the IAT data at a point of distribution or emission, etc.) that identify a content distributor for and an upcoming instance of content distribution. A cloud-based server or service with both playlist knowledge including but not limited information about the content distributor for and the upcoming instance of content distribution and/or timeline(s) represented by the IAT data can deliver associated content for the upcoming instance of content distribution (e.g., an upcoming media program, etc.) to endpoint device(s).

In some embodiments, IAT data as described herein may carry a combination of metadata data fields with values from different metadata sources (e.g., different data fields in the same IAT data delivered to a recipient device may include values authored by different metadata authors, different vendors, etc.) to be decoded, extracted, and/or retrieved, by a recipient device. Additionally, optionally or alternatively, some or all of different metadata values from different metadata sources may be carried as (e.g., EMDF, etc.) payload of data containers and/or constructs outside IAT data.

10. IAT Clock Tick Rate

Today, while 44.1 kHz is the sample rate used in CD audio and some streaming services, 48 kHz is the sample rate used for the vast majority of audio in broadcast and mobile, with occasional use of 96 kHz. In some embodiments, a clock of a clock tick rate (or IAT tick rate) that is a multiple of two or more different sample rates such as 240 kHz (or a multiple of 48 kHz and 96 kHz, etc.) or that has a rational fractional relationship with two or more different sample rates (e.g., having a rational fractional relationship with 48 kHz, 96 kHz, and 192 kHz, etc.) may be used to generate clock ticks for specifying time codes/points (or IAT time samples) on timeline(s) represented by IAT data as described herein.

Additionally, optionally or alternatively, the clock tick rate of the clock used to express a time value for a time code/point in an IAT message as described herein may be set to be compatible with one or more video frame rates. For instance, an IAT tick rate of 240 kHz allows every time code/point (or IAT time sample) to fall on the precise start of a video frame, for some or all of video frame rates supported by AC-4, including but not limited to 29.97 frames per second (fps) and other common (integer/1.001) frame rates.

Additionally, optionally or alternatively, the clock tick rate of the clock used to express individual time codes/points in IAT messages as described herein may be set to be compatible with the finest time resolution in composition time (CT). For instance, a CT value (or instance) may be typically represented in millisecond, which may be represented by an integer number of IAT ticks (e.g., 24 ticks at an IAT clock tick rate of 24 kHz, etc.). As a result, all possible CT values can be precisely (with no error or deviation) expressed as integer numbers of IAT ticks.

Additionally, optionally or alternatively, the clock tick rate of the clock used to express individual time codes/points in IAT messages as described herein may be set to be compatible with transport streams such as those related to synchronized rendering/presentation of primary and second media content with main and companion devices. These transport streams may use a 90-kHz clock, for example to generate PTS values used in the transport layer timing. While not all PTS samples (or values) co-occur with IAT ticks, there is no need to convey all the PTS samples (or values) through IAT ticks or IAT data, precisely because the PTS are conveyed elsewhere (e.g., in the transport layer data units, etc.). In addition, the PTS samples can be readily correlated with other time values such as CT values (e.g., that may exist in a cloud-based service/server, etc.). Within a given media frame such as an audio frame, for typical audio frame lengths, there exists at least one media sample (or audio sample) that co-occurs with an integer PTS value. Based on co-occurring of media samples and PTS values, timelines and/or time points thereof represented by the IAT data and the PTS values can be aligned with (e.g., infinite, with no error or deviation, etc.) precision. In some embodiments, the alignment of these timelines can be done by a server such as an online MRS, rather than by an endpoint device.

In some embodiments, all media processing devices throughout the entire content creation and/or delivery chain may adopt the same clock tick rate for expressing time codes/points (or IAT time samples), thereby simplifying the task of interpreting the time codes/points and avoiding performing conversions between or among the time codes/points by different media processing devices on the same content creation and/or delivery chain.

In some embodiments, when authoring IAT data, a device may start, or assign the very first authored time code/point (or timestamp) at 0 and thereafter (e.g., automatically, etc.) increment at the IAT tick rate.

11. Passing IAT Data to Other Layers

In some embodiments, an endpoint device may incorporate or implement an IAT decoder to decode IAT data carried with a media signal, a media file, a media stream, etc., and pass some or all of the IAT data to all relevant middleware layers, including but not necessarily limited to, any of: content identification data, precise time point indications (e.g., within 1 millisecond or ms, etc.), of which media samples (e.g., audio samples, video frames, etc.) each time code/point (or timestamp) occurs. By default (if no special indicators or offset values are present), the IAT decoder interprets that a serialized IAT message spreading over multiple media frames indicates the time point for (e.g., the first media sample in, etc.) in the last media frame of the multiple media frames for the serialized IAT message.

To support some or all use cases described herein, the IAT decoder can pass the content identification and/or the time code/point up to a relatively high layer such as the middleware layer, the application layer, etc. For instance, an endpoint device such as an Android device may incorporate or implement an IAT decoder to allow its relatively high layer(s) to receive each time code/point within an accuracy (e.g., within 1 ms and possibly better), which may be sufficient to support these use cases including but not limited to descriptive audio, dialog replacement, use cases at sample level accuracy (or at frame-level accuracy with sample realignment), hybrid delivery of audio content (e.g., hybrid Atmos delivery, etc.), etc.

In some embodiments, an IAT decoder implementation may avoid or reduce necessity for a relatively large memory buffer (e.g., a relatively large sample buffer, a relatively large frame buffer, etc.). For instance, in some embodiments, time points for all serialized sequences of IAT messages (each of which may spread over multiple frames) by default (if no special indication/offsets are present) may occur during the respective last serialized frames.

12. IAT Data Transcoding

In some embodiments, a complete IAT message can be included in every media frame for some media coding formats (e.g., PCM and mezzanine coding formats for the purpose of illustration, etc.). In some embodiments, such a complete IAT message can be included in multiple media frames in a serialized version of the IAT message for some other media coding formats (e.g., media emission coding formats for the purpose of illustration, etc.).

Under techniques as described herein, (input) IAT data carried with any of a variety of (input) media coding formats can be transcoded to (output) IAT data carried with any in a variety of (output) media coding formats. When a media processing device configured with IAT processing capabilities as described herein detects changes in media coding formats used to carry the IAT data change and/or changes in bitrates associated with the media coding formats used to carry the IAT data change, the media processing device can reframe and/or transcode IAT data as appropriate.

For example, in response to determining that input IAT messages each included in a single input media frame in an input media signal are to be transcoded into output IAT messages each spreading over multiple media frames in an output media signal, the media processing device may be configured to transcode the IAT messages that were not serialized to the output IAT messages that are serialized over respective multiple media frames in the output media signal.

Conversely, in response to determining that input IAT messages each spreading over multiple media frames in an input media signal are to be transcoded into output IAT messages each included in a single media frame in an output media signal, the media processing device may be configured to transcode the IAT messages that were serialized to the output IAT messages each of which is not serialized but rather is confined in a single media frame in the output media signal.

Additionally, optionally or alternatively, in response to determining that input IAT messages each spreading over N media frames (where N is a positive integer greater than two (2)) in an input media signal are to be transcoded into output IAT messages each spreading over M media frames (where M is a positive integer greater than two (2) but is different from N) in an output media signal, the media processing device may be configured to transcode the IAT messages that were serialized to every N input media frames in the input media signal to the output IAT messages each of which is serialized over respective M media frames in the output media signal.

Thus, under techniques as described herein, input IAT messages as received with an input media signal in an input coding format such as a PCM or mezzanine coding format may be transcoded into output IAT messages with an output media signal in an output coding format such as an emission coding format. Each of the input IAT messages may be carried by a single input media frame in the input coding format, whereas each of the output IAT messages may be carried by N output media frames (where N is a positive integer greater than two (2)) in the output coding format.

At emission, to serialize the output IAT messages over their respective output media frames, input media content sufficient to populate every N output media frames may be collected from the input media signal. A time point that corresponds to the last output media frame in the respective N output media frames may be determined based on the input IAT messages. A serialized version of each of the output IAT messages may be generated to spread over the respective N output media frames.

The time code/point represented by the serialized version of each such output IAT message may correspond to a time point of (e.g., the first media sample in, etc.) the last, or the first, output media frame of the respective N output media frames. Last or first shall be specified in the IAT message, with last the default.

The IAT data reframing operation (or transcoding operation) may be performed for either live media content or file-based media content. Additionally, optionally, or alternatively, IAT data reframing operation such as described above may be performed in operational scenarios in which an input media signal represents a first media emission signal in a first media emission coding format and an output media signal represents a second media emission signal in a second media emission coding format.

IAT data can be carried below or at a variety of ceiling bitrates (or ceiling data rates) with a variety of media coding formats.

As discussed, for media content coded in non-emission coding formats such as PCM, Dolby E and/or Dolby ED2 coding formats, an IAT message may be carried in every media frame (e.g., audio frame, video frame, etc.) or equivalent. For some of these non-emission coding formats, the carriage of IAT data may impact bitrates allocated for carrying the media content with which the IAT data is for or is associated. For some others of these non-emission coding formats, the carriage of IAT data may not impact bitrates allocated for carrying the media content with which the IAT data is for or is associated; thus, in these embodiments, the media content is protected from any damage as a result of adding the IAT data.

In an example, Dolby ED2 allocates 216 kbps for audio bitrate per channel, with 8 channels per stream. As compared with some other media coding formats, Dolby ED2 is efficient with 140 kbps available for carrying media metadata by default and up to 275 kbps or even 4×140 kbps. A portion of the bitrate (e.g., 140 kbps, 274 kbps, 4×140 kbps, etc.) for carrying media metadata may be used as a ceiling bitrate for carrying IAT data in the media metadata, for example to support a maximum of 30 insertions of IAT per second.

In another example, a media emission signal may be transmitted at a bitrate of 64 kbps or higher. An IAT message may be included in a single media frame, or may be serialized across multiple media frames in the media emission signal up to a maximum number of media frames of serialization such as 20-30 audio frames. As a result, the IAT message can be carried at or below a ceiling rate that is much lower than the overall bitrate for the media emission signal. Additionally, optionally or alternatively, the maximum number of media frames of serialization can be selected to allow a relatively short serialization time period such as 0.02-0.5 second. For instance, the maximum number of media frames of serialization of a single IAT message may be selected to ensure the IAT data is carried at or below 5% of the overall bitrate, the bitrate for carrying media content data, etc. A payload size (e.g., 5% of 64 kb or 3200 bits, etc.) for an IAT message as described herein may be selected within latency and data rate budgets.

In some embodiments, IAT data may not be carried or may be carried in a limited form in media emission signal that is being transmitted below a minimum bitrate such as below 64 kbps.

IAT data may carry data field values to indicate a time until valid, a sample offset, etc. These field values may be used by recipient devices to perform checks on validity of the IAT data received under varying network and system conditions (e.g., a long delay or a transmission burst causes some of the IAT data to be no longer valid, etc.).

Media content carried in a media signal may be edited or spliced (e.g., inserting or replacing a portion of the media content with advertisements or other media content items, etc.) in a content creation and/or delivery chain, for example at an emission point, at a media splicing point before or after an emission point, etc.

In some embodiments, to reduce complexity and memory requirements, a serialization sequences of an IAT message begins (e.g., only, etc.) on I-frames. This may be consistent with media splicing operations that edit or splice different media content items at I-frames.

In some embodiments, I-frames can occur at either every 500 ms (e.g., audio, audio only, etc.) or when video I-frames occurs (e.g., audio and video, etc.). In some embodiments, it is not permitted to have more frequent IAT serialization sequences than I-frames. In some other embodiments, it is permitted to have more frequent IAT serialization sequences than I-frames; in these embodiments, every I-frame may be the start of a serialization sequence of an IAT message.

A timeline represented by IAT data may (e.g., simply, sufficiently, etc.) begin with a "timeline starts now" flag such as a timeline start code. In some embodiments, an IAT decoder can ignore and terminate any previous IAT data that has not been finished processing when the IAT decoder receives such a flag.

13. Timelines of Original and Derivative Versions

Techniques as described herein can be used to handle timelines for multiple versions including original and derivative versions of a media content item. In some embodiments, relationship information (including but not limited to edit decision lists or EDLs) for timelines for the multiple versions may be managed in, and received from, a network cloud, which would optionally make this information available to an MRS, and not in the IAT data for any of these versions. Additionally, optionally or alternatively, delivering appropriate companion content for any of the multiple versions at respective correct time points in the multiple versions may be handled by server-side components.

A given media content item may exist in more than one version, and these different versions may have different timelines with special relationships to the original timeline of the original version of the media content item. In some embodiments, a derivative version may have a timeline of an identical length to that of the original timeline but with different media content; for example, in one of the derivative version or the original version, objectionable language is replaced with other language that takes the same amount of time. In some embodiments, a derivative version may have a timeline of a shorter length than that of the original timeline; for example, in one of the derivative version or the original version, a scene is deleted or shortened. In some embodiments, a derivative version may have a timeline of a longer length than that of the original timeline; for example, in one of the derivative version or the original version, a scene or bonus content, which might have been deleted, is inserted or reinserted. In some embodiments, a derivative version may have a combination of several types of special relationships as discussed above; for example, a TV version of a film may be edited to both replace some content in-time, and for length.

IAT data as described herein can be used to reuse and correctly relate associated content to main content in the original version as well as in the derivative versions that have various special relationships to the original version. The IAT data can be used to avoid creating multiple versions of the associated content in order for the associated content to be correctly related (e.g., timewise, context-wise, etc) to the main content. Start and stop time points (e.g., when an actor appears, etc.) in the original version to relate the associated content (e.g., the actor's information, etc.) can be reused or mapped to as start and stop points (e.g., when an actor appears, etc.) in the derivative versions to relate the associated content (e.g., the actor's information, etc.).

In some embodiments, IAT data for multiple versions of media content carries a respective (e.g., content, timeline, etc.) ID for each version in the multiple versions. Each version in the multiple versions carries IAT data representing a respective timeline whose time codes/points increment consistently (e.g., based on a constant tick rate such as 240 kHz, automatically, etc.), regardless of what special relationships between each such version and the original version. All special relationships between or among the timelines of the multiple versions can be stored online by a server/service (e.g., a cloud-based server/service, etc.), and are not reflected in the media content or in the timelines themselves. For example, the (e.g., content, timeline, etc.) ID carried in a media signal (or bitstream) containing the IAT data defining the timeline of the version does not necessarily indicate that the version is related to another version; similarly, time codes/points also do not indicate that the version is related to another version. However, when an endpoint device interacts with the server/service with the IAT data for the (derivative or original) version, the server/service can access relationship information (e.g., stored in the cloud and not carried in the IAT data, etc.) between or among the multiple versions.

To illustrate, consider a 7 second media content item "Hello". An (e.g., content, timeline, etc.) ID for the original version may be, without limitation, ABCD. An (e.g., content, timeline, etc.) ID for a derivative version may be, without limitation, KLMN. The derivative version may be similar to the original version except that in the derivative version, the media content portion from 2 seconds to 4 seconds is deleted, so that the derivative version is 5 seconds long. The respective IAT data, using simplified timestamps of one unit per second, may be as follows:

Version 1 IAT: ID: ABCD; Timeline 1 2 3 4 5 6 7
Version 2 IAT: ID: KLMN; Timeline: 1 2 3 4 5

The server/service may be accessible to the cloud-based (e.g., content, timeline, etc.) relationship information as follows: Content KLMN is derived from content ABCD such that the first two seconds are identical, then the last three seconds of KLMN are identical to the last three seconds of ABCD.

Thus, there is no indication of this relationship in the IAT data, but rather only in the cloud.

It should be noted that in various embodiments, the derivative version may be shorter or longer than, or the same as, the original version. For example, the derivative version may have added media content portions added to the starting point of the media content in the original version. Neither the IAT author nor the IAT decoder need to author or extract the relationship information between versions. Additionally, optionally or alternatively, neither the IAT author nor the IAT decoder need to manage what specific associated content is to be rendered or presented; rather, this can be handled by an endpoint interacting with the server/service in the network cloud. The associated content can be delivered correctly to the endpoint device, for example, through one or more streaming servers, one or more CDNs, and/or one or more cloud-based servers with EDLs.

14. Timeline Interruption

As discussed, a timeline of media content such as a main program can be interrupted to allow interstitial media content such as secondary or associated media content to be rendered or presented by an endpoint to a user. IAT data may be used to prevent a secondary/associated media content item from spilling over beyond an allocated time duration into a subsequent time duration for another secondary/associated media content item and/or for the main program. Spilling over may be less a problem for media content encoded in non-emission coding formats, as each media frame in such formats may carry a full IAT message that can be used to terminate a media content item relatively precisely.

IAT-based techniques as described herein can be used to prevent spilling over even when a serialized sequence of an IAT message over multiple media frames is used, for example at or near an emission point. In some embodiments, any timeline represented by IAT data may begin and end cleanly. For instance, to indicate the start of a timeline of a media content item, the serialized sequence of the very first IAT message in a plurality of messages that represent the timeline can begin at the first possible I-frame in the media content item. Additionally, optionally or alternatively, any serialized sequence of an IAT message ends before the next I-frame occurs. Thus, in some embodiments, a serialized sequence of an IAT message exists (e.g., only, etc.) between two adjacent I-frames without any intermediate I-frame, and thus cannot be extended over a longer time duration than between the two adjacent I-frames.

An IAT inserter or author may access other devices or components to determine time points for splicing and/or changing media content items. These time points may be used to make sure that serialized sequences of any timeline for any media content item begin at I-frames and end before respective next I-frames, and begin the very first time code of the timeline at the first available I-frame. As a backup method against spillover, any segmented content (or a media content item spliced in) can begin with a timeline start code (e.g., a null value, a reset value, a specific binary sequence, a specific pilot code, etc.) wiping out or removing any unprocessed IAT messages of a previous timeline of preceding media content or a preceding media content item.

15. Presence of IAT Data with Media Content

In some embodiments, not all media content received or injected into a content creation and/or delivery chain from some points on may contain IAT data. IAT inserters or authors can be implemented at some or all points in the content creation and/or delivery chain to inspect the media content for presence or absence of IAT data.

For example, a device implementing IAT insertion or authoring functionality may operate with a media emission encoder to inspect and ensure IAT data to be present in emission media content including but not limited to a timeline start code to indicate the beginning of a media content item to prevent spillover.

Additionally, optionally or alternatively, a device implementing IAT insertion or authoring functionality may operate with a media transcoder at a non-emission point to inspect and ensure IAT data to be present in emission media content including but not limited to special IAT messages indicating that there was no upstream IAT data received; as with all IAT messages the special IAT messages may include, but are not necessarily limited to only, a timeline start code to indicate the beginning of a media content item or the beginning of an inserted timeline for restarting and/or terminating any unprocessed IAT messages of previous media content, a previous timeline or a previous media content item.

In some embodiments, IAT data may carry versioning information. The versioning information may be set at specific levels including but not limited to the highest level in data containers and/or constructs carrying media content data and/or IAT data. The versioning information may be used as a basis in manipulating (e.g., updating, etc.) the IAT data.

16. Example Additional Data in IAT Data

In some embodiments, IAT data may carry URLs or other direct linking information (e.g., in hash values, in encrypted form decodable only at authorized endpoints, etc.) for serving associated content. In some embodiments, IAT data may not carry URLs or other direct linking information for serving associated content.

In some embodiments, some or all of IAT data as described herein may be inserted by a media encoder. In some embodiments, some or all of IAT data as described herein may be inserted by a separate device (e.g., co-located, etc.) operating with a media encoder, instead of directly by the media encoder.

In some embodiments, IAT data as described herein may carry a (e.g., unique, etc.) identifier such as UUID, EIDR, Ad-ID, identifiers as specified in ATSC or SMPTE, and so forth. The identifier may be preserved and protected regardless of which data constructs and/or containers are used to carry the IAT data.

In some embodiments, some or all of IAT data as described herein may be carried in data constructs and/or containers for carrying media content data, rather than in data constructs and/or containers for specifically carrying media metadata. For instance, EMDF payloads may be used to carry the IAT data in media emission signals.

17. Example Process Flows

Figure 6A:
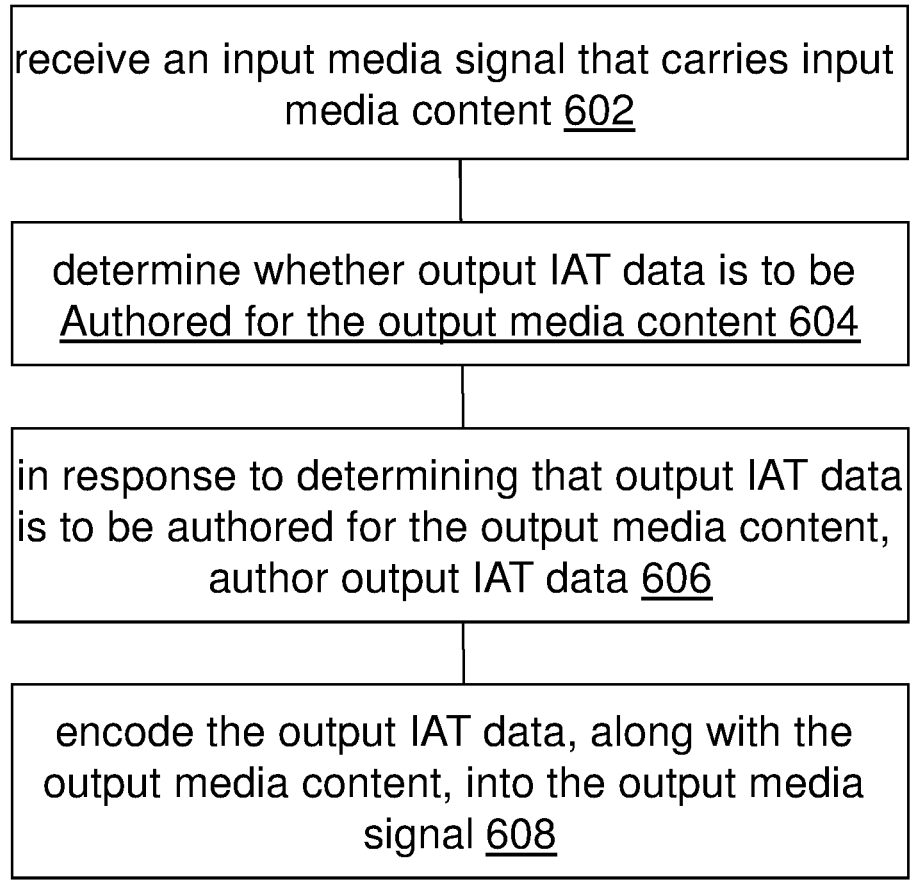
FIG. 6A through FIG. 6C illustrate example process flows.
Figure 6B:
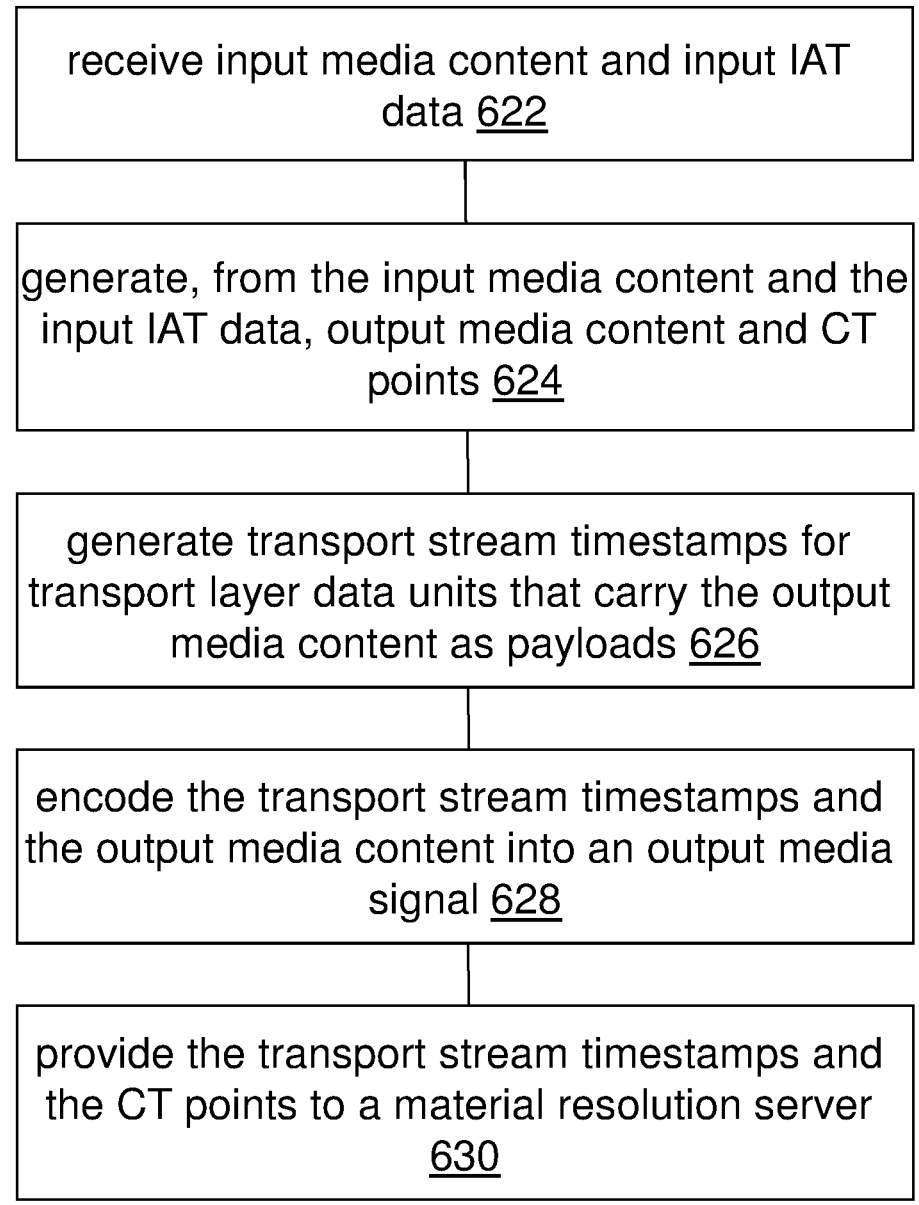
Figure 6C:
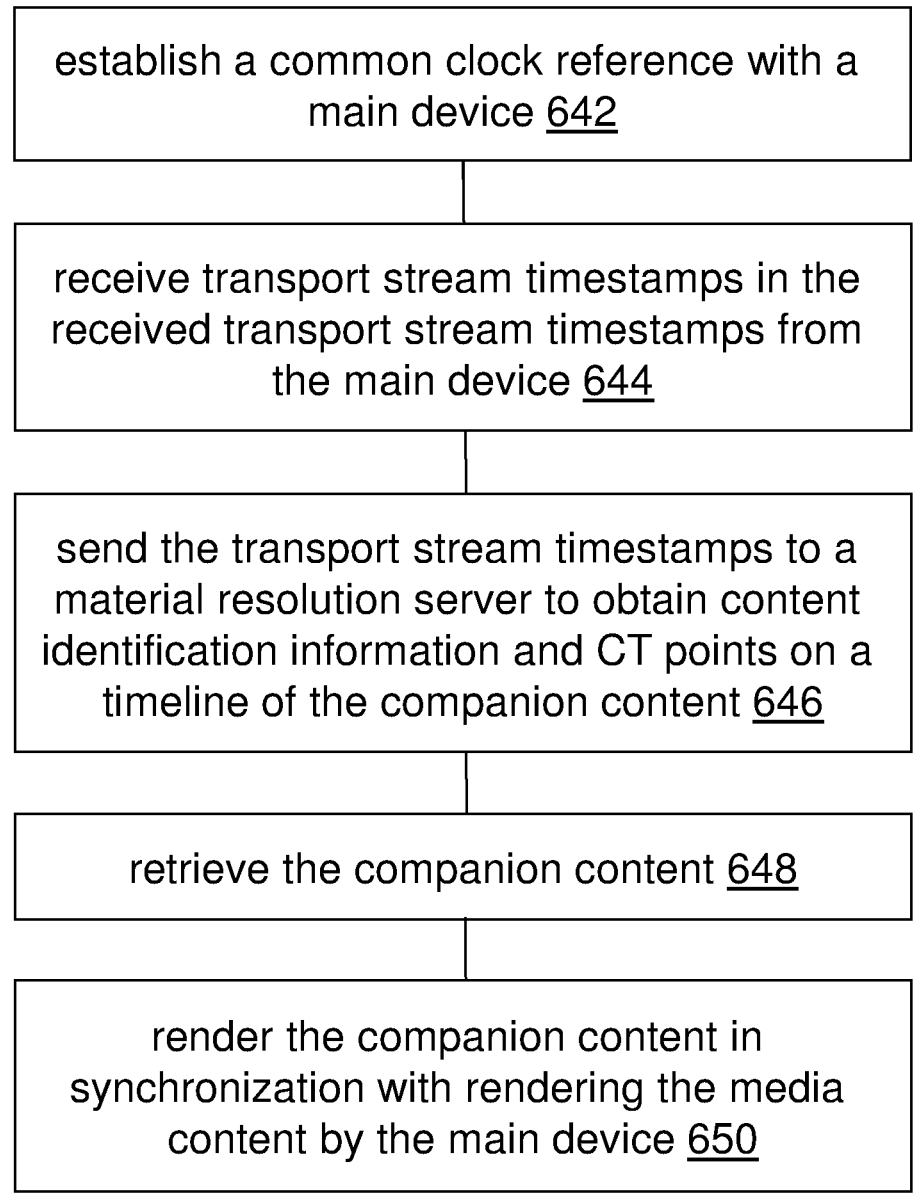

FIG. 6A through FIG. 6C illustrate example process flows. In some embodiments, one or more computing devices or units may perform this process flow.

FIG. 6A illustrates an example process flow that may be implemented by a media system (or device) as described herein. In block 602, the media system receives an input media signal that carries input media content, the input media content being used to generate output media content in an output media signal.

In block 604, the media system determines whether output identification-and-timing (IAT) data is to be authored for the output media content.

In block 606, the media system, in response to determining that the output IAT data is to be authored for the output media content, authors output IAT data for the output media content.

In block 608, the media system encodes at least a part of the output IAT data for at least a part of the output media content, along with the part of the output media content, into the output media signal.

In an embodiment, the media system is further configured to perform: determining whether the input media signal includes input IAT data for the input media content; in response to determining that the input media signal does not include the input IAT data for the input media content, authoring the output IAT data for the output media content; etc.

In an embodiment, the media system is further configured to perform: determining whether the input media signal includes input IAT data for the input media content; in response to determining that the input media signal includes the input IAT data for the input media content, determining whether at least a portion of the input IAT data is to be modified; in response to determining that at least a portion of the input IAT data is to be modified, authoring the output IAT data for the output media content by modifying at least the portion of the input IAT data; etc. In an example, the input IAT data may be CT-based or may be based on a network's clock which is different from a reference clock used by the system. Thus, in some operational scenarios, IAT data may be generated again even though there already exists the input IAT data. In another example, there may be pre-existing IAT data (e.g., the input IAT data, etc.) for pre-existing media content (e.g., the input media content, etc.), but some editing need to be performed on some or all the pre-existing IAT data to generate new output IAT such as newly edited media content (e.g., editing on the input media content, etc.).

In an embodiment, the media system is further configured to perform: determining whether the input media signal includes input IAT data for the input media content; in response to determining that the input media signal includes the input IAT data for the input media content, determining whether the input IAT data is to be transcoded; in response to determining the input IAT data is to be transcoded, transcoding the input IAT data into the output IAT data; etc.

In an embodiment, the output IAT data includes a content identifier for the output media content and a plurality of time codes over a time duration covered by the output media content.

In an embodiment, the output IAT data includes a plurality of IAT messages each of which is carried by one or more respective media frames in the output media signal. In an embodiment, the output IAT data includes a plurality of IAT messages at least some of which each carry the content identifier and a time code in the plurality of time codes. In an embodiment, the output IAT data includes a plurality of IAT messages at least some of which each carry a time code in the plurality of time codes but not the identifier. In an embodiment, the output IAT data includes a plurality of IAT messages each of which informs a specific time point within a specific media program; the specific time point is identified by a time code in the plurality of time codes; the specific media program is identified by the content identifier. In an embodiment, the output IAT data includes a plurality of IAT messages at least one of which comprises a direct link to access associated content, from an external content source, that is related to the media content. In an embodiment, the output IAT data includes a plurality of IAT messages at least one of which is a serialized sequence spreading over multiple output media frames. In an embodiment, a time code in the serialized sequence indicates a specific time point that falls within the last media frame in the multiple output media frames. In an embodiment, a time code in the serialized sequence indicates a specific time point that falls within a media frame indicated by one or more of: frame offsets or sample offsets, from one of: the last media frame of the multiple output media frames, a specific sample in the last frame of the multiple output media frames, etc.

In an embodiment, the output IAT data comprises a timeline start code to indicate a beginning of a timeline for a media program represented in the output media content.

In an embodiment, the output IAT data comprises timecodes in reference to a reference clock with a clock tick rate that has one or more rational relationships with one or more sample rates of media signals in one or more media coding formats. In an embodiment, the timecodes automatically increment, based on the clock tick rate of the reference clock, to cover a time duration covered by the output media content.

In an embodiment, the output IAT data indicates a timeline of a media program in the output media content. In an embodiment, the timeline of the media program is for a specific version of the media program among a plurality of versions of the media program; the plurality of versions of the media program corresponds to a plurality of timelines; each version in the plurality of versions of the media program corresponds to a respective timeline in the plurality of timelines.

In an embodiment, the IAT data does not comprise edit decision relationships between the specific version of the media program and other versions of the media program; a downstream recipient device accesses the edit decision relationships maintained by a remote server.

In an embodiment, the media system is further configured to perform: receiving second input media content while receiving the media content from the input media signal; generating second output IAT data for second output media content generated from the second input media content; splicing the second output media content and one or more portions of the output media data into the output media signal; encoding the second output IAT data for the second output media content as a part of media metadata in the output media signal; etc. In an embodiment, the second input media content is retrieved from a cloud based server. In an embodiment, the second input media content is received in-band in the input media signal. In an embodiment, the second output IAT data begins with a timeline start code. In an embodiment, the IAT data identifies in advance a second media program in the second input media content and a second time point at which the second media program is to be spliced to be spliced into the output media signal. In an embodiment, the IAT data further identifies in advance a third media program following the second media program and a third time point at which the third media program is to be spliced into the output media signal.

In an embodiment, the IAT data consumes no more than a ceiling bitrate. In an embodiment, the ceiling rate represents a fraction of an overall bitrate for transmitting the output media signal.

FIG. 6B illustrates an example process flow that may be implemented by a media system (or device) as described herein. In block 622, the media system receives an input media signal that carries input media content and input identification-and-timing (IAT) data for the input media content.

In block 624, the media system generates, from the input media content and the input IAT data, output media content and a plurality of composition time (CT) points on a timeline represented by the input IAT data.

In block 626, the media system generates transport stream timestamps for transport layer data units that carry the output media content as payloads;

In block 628, the media system encodes the transport stream timestamps and the output media content into an output media signal;

In block 630, the media system provides the transport stream timestamps and the plurality of CT points to a material resolution server to cause companion content to be rendered by one or more companion devices in synchronization with rendering the output media content.

FIG. 6C illustrates an example process flow that may be implemented by a media system (or device) as described herein. In block 642, the media system establishes a common clock reference with a main device that receives transport stream timestamps and media content in a media signal.

In block 644, the media system receives one or more transport stream timestamps in the received transport stream timestamps from the main device.

In block 646, the media system sends the one or more transport stream timestamps to a material resolution server to obtain content identification information for companion content and one or more composition time (CT) points on a timeline of the companion content.

In block 648, the media system retrieves the companion content based at least in part on the one or more CT points.

In block 650, the media system renders the companion content in synchronization with rendering the media content by the main device.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

18. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques as described herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

19. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for inserting identification-and-timing (IAT) data in an output media content, the method comprising:
   receiving an input media signal that carries input media content; and
   generating the output media content in an output media signal based on the input media content;
   wherein the generating includes:
      determining whether the input media signal includes input IAT data for the input media content;
      in response to determining that the input media signal does not include IAT data, authoring output IAT data for the output media content; and
      encoding at least a part of the output IAT data for at least a part of the output media content, along with the part of the output media content, into the output media signal, wherein such output IAT data includes a sequence of IAT messages, wherein each IAT message in the sequence of IAD messages is carried by one or more frames of the output media content, and specifies a specific time point in a specific program in the output media content, wherein the sequence of IAT messages is initialized at an I-frame in the output media signal.

2. The method of claim 1, further comprising:
   in response to determining that the input media signal includes input IAT data for the input media content, determining whether the input IAT data complies with a selected encoding format;
   in response to determining the input IAT data does not comply with the selected encoding format, transcoding the input IAT data into the output IAT data.

3. The method of claim 1, wherein the output IAT data includes a plurality of IAT messages at least some of which each carry a content identifier identifying the specific program.

4. The method of claim 1, wherein the output IAT data includes a plurality of IAT messages at least some of which each carry a time code identifying the specific time point.

5. The method of claim 1, wherein the output IAT data includes a plurality of IAT messages at least one of which comprises a direct link to access associated content, from an external content source, that is related to the media content.

6. The method of claim 1, wherein the output IAT data includes a plurality of IAT messages at least one of which is a serialized sequence spreading over multiple output media frames.

7. The method of claim 6, wherein a time code in the serialized sequence indicates a specific time point that falls within the last media frame in the multiple output media frames.

8. The method of claim 6, wherein a time code in the serialized sequence indicates a specific time point that falls within a media frame indicated by one or more of: frame offsets or sample offsets, from one of: the last media frame of the multiple output media frames or a specific sample in the last frame of the multiple output media frames.

9. The method of claim 1, wherein the output TAT data comprises a timeline start code to indicate a beginning of a timeline for a media program represented in the output media content.

10. The method of claim 1, wherein the output TAT data comprises timecodes in reference to a reference clock with a clock tick rate that has one or more rational relationships with one or more sample rates of media signals in one or more media coding formats.

11. The method of claim 10, wherein the timecodes automatically increment, based on the clock tick rate of the reference clock, to cover a time duration covered by the output media content.

12. The method of claim 1, wherein the output TAT data indicates a timeline for a specific version of the media program among a plurality of versions of the media program, wherein the plurality of versions of the media program corresponds to a plurality of timelines, and wherein each version in the plurality of versions of the media program corresponds to a respective timeline in the plurality of timelines.

13. The method of claim 12, wherein the TAT data does not comprise edit decision relationships between the specific version of the media program and other versions of the media program, and wherein a downstream recipient device accesses the edit decision relationships maintained by a remote server.

14. The method of claim 1, further comprising:
   receiving second input media content while receiving the media content from the input media signal;
   generating second output TAT data for second output media content generated from the second input media content;
   splicing the second output media content and one or more portions of the output media data into the output media signal;
   encoding the second output TAT data for the second output media content as a part of media metadata in the output media signal.

15. The method of claim 14, wherein the second input media content is retrieved from a cloud based server.

16. The method of claim 14, wherein the second input media content is received in-band in the input media signal.

17. The method of claim 14, wherein the second output TAT data begins with a timeline start code.

18. The method of claim 14, wherein the TAT data identifies in advance a second media program in the second input media content and a second time point at which the second media program is to be spliced to be spliced into the output media signal.

19. The method of claim 18, wherein the TAT data further identifies in advance a third media program following the second media program and a third time point at which the third media program is to be spliced into the output media signal.

20. The method of claim 1, wherein the TAT data consumes no more than a ceiling bitrate.

21. The method of claim 20, wherein the ceiling bitrate represents a fraction of an overall bitrate for transmitting the output media signal.

22. The method of claim 1, further comprising:
   determining whether the input media signal includes input TAT data for the input media content;
   in response to determining that the input media signal includes the input TAT data for the input media content, determining whether at least a portion of the input IAT data is to be modified;
   in response to determining that at least a portion of the input IAT data is to be modified, authoring the output IAT data for the output media content by modifying at least the portion of the input IAT data.

23. A computer-implemented method comprising:
receiving, by a media encoder, an input media signal that carries input media content and input identification-and-timing (IAT) data for the input media content, wherein the input IAT data includes a sequence of IAT messages, wherein each message in the sequence of IAT messages is carried by a frame of the media content, and indicates a specific time point of said IAT message in a specific program in the media content, wherein the sequence of IAT messages is initialized at an I-frame in the input media signal;
generating, by the media encoder from the input media content and the input IAT data, output media content and a plurality of composition time (CT) points on a timeline represented by the input IAT data;
generating, by the media encoder, transport stream timestamps for transport layer data units that carry the output media content as payloads;
encoding, by the media encoder, the transport stream timestamps and the output media content into an output media signal;
providing, by the media encoder, the transport stream timestamps and the plurality of CT points to a material resolution server to cause companion content to be rendered by one or more companion devices in synchronization with rendering the output media content.

24. A computer-implemented method comprising:
establishing, by a secondary device, a common clock reference with a main device that receives transport stream timestamps and media content in a media signal;
receiving, by the secondary device, one or more transport stream timestamps in the received transport stream timestamps from the main device;
sending, by the secondary device, the one or more transport stream timestamps to a material resolution server to obtain content identification information for companion content and one or more composition time (CT) points on a timeline of the companion content;
retrieving, by the secondary device, the companion content based at least in part on the one or more CT points;
rendering, by the secondary device, the companion content in synchronization with rendering the media content by the main device.

25. A non-transitory computer readable storage medium, storing software instructions, which when executed by one or more processors cause performance of any of the methods as recited in claim 24.

26. A computing device comprising one or more processors and one or more storage media storing a set of instructions which, when executed by the one or more processors, cause performance of any of the methods as recited in claim 24.

* * * * *